United States Patent [19]

Yamanouchi

[11] Patent Number: 5,546,234
[45] Date of Patent: Aug. 13, 1996

[54] ZOOM LENS BARREL IN WHICH A MOVING STROKE OF THE FRONT LENS GROUP IS LONG

[75] Inventor: Haruhiko Yamanouchi, Yokohama, Japan

[73] Assignee: Canon Kabushiki Kaisha, Tokyo, Japan

[21] Appl. No.: 392,082

[22] Filed: Feb. 22, 1995

Related U.S. Application Data

[62] Division of Ser. No. 793,609, Nov. 18, 1991.

[30] Foreign Application Priority Data

| Nov. 20, 1990 | [JP] | Japan | 2-316237 |
| Nov. 20, 1990 | [JP] | Japan | 2-316240 |
| Nov. 20, 1990 | [JP] | Japan | 2-316241 |
| Nov. 20, 1990 | [JP] | Japan | 2-316242 |
| Nov. 20, 1990 | [JP] | Japan | 2-316243 |

[51] Int. Cl.⁶ ........................... G02B 15/14
[52] U.S. Cl. .......................... 359/700; 359/699; 359/701
[58] Field of Search ................. 359/700, 696, 359/704, 699, 698, 701, 705, 695

[56] References Cited

U.S. PATENT DOCUMENTS

| 4,247,169 | 1/1981 | Uesugi | 359/701 |
| 4,458,990 | 7/1984 | Kawai | 359/700 |
| 4,690,505 | 9/1987 | Iizuka | 359/822 |
| 4,729,644 | 3/1988 | Ueyama | 359/700 |
| 5,091,802 | 2/1992 | Imaoka | 359/694 |
| 5,293,192 | 3/1994 | Akitake | 354/219 |
| 5,301,066 | 4/1994 | Higuchi | 359/698 |
| 5,448,414 | 9/1995 | Hamasaki | 359/700 |

*Primary Examiner*—Georgia Y. Epps
*Assistant Examiner*—Ricky Mack
*Attorney, Agent, or Firm*—Robin, Blecker, Daley & Driscoll

[57] ABSTRACT

A zoom lens barrel is provided in which the amount of forward movement made by a focus lens is altered in accordance with a change in a focal length caused by a zooming operation. The zoom lens barrel includes a moving mechanism for rotating a cam member around an optical axis and for moving this cam member in the direction of the optical axis in response to the zooming operation; a first cam for moving a zoom lens in the direction of the optical axis on the basis of the rotation around the optical axis and the movement in the direction of the optical axis; and a second cam for moving the focus lens, which focus lens is used for zooming and focusing, in the direction of the optical axis. The first and second cams are provided for the cam member.

8 Claims, 20 Drawing Sheets

FIG. 2 (WIDE STATE)

FIG. 11 (TELEPHOTO STATE)

(WIDE STATE)

ZOOM LENS BARREL IN WHICH A MOVING STROKE OF THE FRONT LENS GROUP IS LONG

This application is a division of application Ser. No. 07/793,609, filed Nov. 18, 1991.

BACKGROUND OF THE INVENTION

1. Field of the Invention

The present invention relates to an optical-type zoom lens barrel called an internal focusing or rear focusing type barrel.

2. Related Background Art

In addition to use of compact zoom lens barrels of higher magnification, there is a general trend toward automatic focusing in recent years. Demand has been increasing for an internal focusing or rear focusing type barrel in which focus lenses are lightweight and movable components are not in direct contact with the outside. Due to such an increase in demand, various mechanisms described below have been proposed.

A zoom lens barrel has been proposed in Japanese Patent Laid-Open Nos. 57-37307, 63-304217, 64-35515, 64-35516, etc. Such a zoom lens barrel is designed so that tracks along which a focus lens group is moved while zooming is being performed functions in a manner related to a part of a focusing operation performed by the focus lens group. (This type of zoom lens barrel is referred to as a one-cam type barrel.) In addition to this type of barrel, there are additional types of zoom lens barrels described below.

(A) A zoom lens barrel disclosed in U.S. patent application Ser. No. 07/603,539 has been proposed by the applicant of this invention. It is designed so that tracks along with a focus lens group is moved while zooming is being carried out functions independently of a focusing operation performed by the focus lens groups. An independent focusing cam is provided for such a zoom lens barrel. (This type of zoom lens barrel is referred to as a two-cam type barrel.)

(B) A zoom lens barrel of a two-cam type is disclosed in Japanese Patent Laid-Open No. 63-49715.

(C) A zoom lens barrel in which a first lens group is disposed in a fixing portion is disclosed in Japanese Patent Application Laid-Open No. 63-314511.

The conventional zoom lens barrels mentioned above have the following disadvantages:

As regards (A), a cam member for focusing and another cam member for a zoom lens group are required, thus increasing the cost thereof.

As regards (B), it has more components than the two-cam type barrel has.

As regards (C), because the first lens group is a fixed lens group, it is difficult to render lenses compact.

To change the closest camera-to-object distance by zooming, a mechanical stopper, for changing the angle through which a focus lens rotates, has been used for a long time, and a modification has been made to a shape on the closest end of a lens barrel.

As mentioned previously, there has been a general trend toward automatic focusing for zoom lenses, and demand has been increasing for the internal focusing or rear focusing type barrel in which focus lenses are lightweight and movable components are not in direct contact with the outside.

With a zoom lens having 3–4 times magnification, even if the closest distance in a telephoto state restricts the closest distance in a wide state, this does not cause much trouble. The same closest distance can be used over an entire zooming range.

However, if a zoom lens of high magnification is used, it is difficult to satisfy optical properties in the telephoto state at the closest distance. For this reason, even when optical properties in the wide state at the closest distance are excellent, a photograph can be taken only within the closest camera-to-object distance which is determined by the optical properties in the telephoto state.

As regards automatic focusing, a switching mechanism is provided in which a rotation angle for focusing restricts the closest distance for focusing. Because zooming is carried out by hand, when the switching mechanism is charged, an over current flows to a focus driving motor. Consideration must be taken to prevent such a trouble from occurring.

The following structures have hitherto been used for retaining a first lens barrel which moves a first lens group a considerable distance toward an object.

(1) Either a fixed barrel having a mating portion of a predetermined length or a cam barrel rotatable at a fixed position is used to retain the first lens barrel.

(2) The first lens barrel is provided with a plurality of cam followers which are engaged with cam grooves formed on a cam barrel rotatable at a fixed position and with straight grooves formed on a fixed lens barrel. The first lens barrel is thereby prevented from collapsing.

As regards item (1), however, it is required that the length of the first lens barrel be approximately equal to the radius of the mating portion besides the distance the first lens group moves. This becomes an obstacle to rendering the zoom lenses compact.

As regards item (2), it is necessary to render the cam followers rigid. Errors in the collapse of the lens barrel increase, depending on the rising angle of a cam.

SUMMARY OF THE INVENTION

According to one aspect of this invention, there is provided a compact zoom lens barrel of an internal focusing or rear focusing type. In such a zoom lens barrel, the number of components is reduced, and a first lens is moved by zooming in the direction of an optical axis, and in response to this movement a cam member is rotated and moved in the optical axis direction. A zooming cam and a focusing cam are provided for the cam member. The zooming cam is used for changing the position of a zoom lens group on the basis of the rotation and the movement in the optical axis direction. The focusing cam is used for focusing as well as zooming.

According to another aspect of this invention, there is provided a zoom lens barrel in which, in cooperation with a zooming operation, the position where a focusing cam is in contact with a focusing cam follower is changed to alter the amount of forward movement made by a focus adjusting lens. The displacement of the cam is set so that the closest distance remains equal from a wide end to a predetermined focal length and increases from the predetermined focal length to a telephoto end. The length of the cam is set so that a rotation angle for focusing is made equal from the wide end to the telephoto end.

According to a further aspect of this invention, there is provided a zoom lens barrel in which the maximum value of the amount of a focusing operation affecting a focusing member remains fixed regardless of a zooming operation, and the amount of the focusing operation with respect to a specific distance remains substantially fixed on the criterion of an infinite distance. An object distance, which corresponds to the distance between a position of the focusing operation for the specific distance and a position of the focusing operation for the maximum value, is changed continuously by the zooming operation. Thus, even in a zooming region on a wide end, the zoom lens barrel can be operated as smoothly as when a photograph is taken in the closest range.

According to yet another aspect of this invention, there is provided a zoom lens barrel in which, in cooperation with a zooming operation, the position where a focusing cam is in contact with a focusing cam follower is changed to alter the amount of forward movement made by a focus adjusting lens. The displacement of the cam is set so that the focus adjusting lens on a wide end can be focused over a closer range than on a telephoto end.

According to another aspect of this invention, there is provided a compact zoom lens barrel in which a first lens group is moved by a zooming operation and a zoom lens having a cam barrel moving in the direction of an optical axis in response to this movement. In such a zoom lens barrel, a first lens barrel which moves in cooperation with the zooming operation by the first lens group is mated with an outside diameter of a fixed barrel; the cam barrel is mated with an inside diameter of the fixed barrel; and a portion of the cam barrel is mated with the first lens barrel. Thus, even when the magnification of the zoom lens barrel is high, precision is not decreased.

DETAILED DESCRIPTION OF THE PREFERRED EMBODIMENTS

First embodiment

Figure 1:
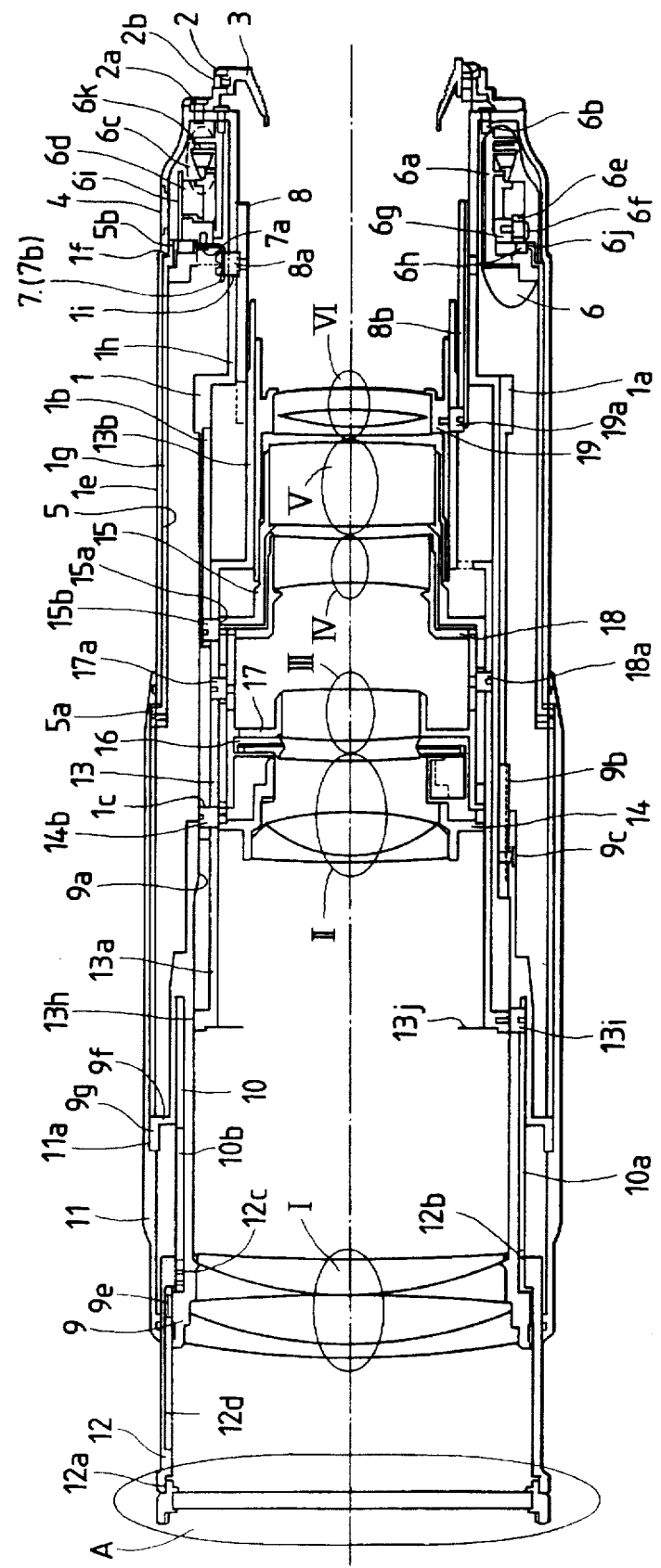
FIG. 1 is a cross-section view showing a zoom lens barrel according to a first embodiment of this invention when lenses are in a telephoto state.
Figure 2:
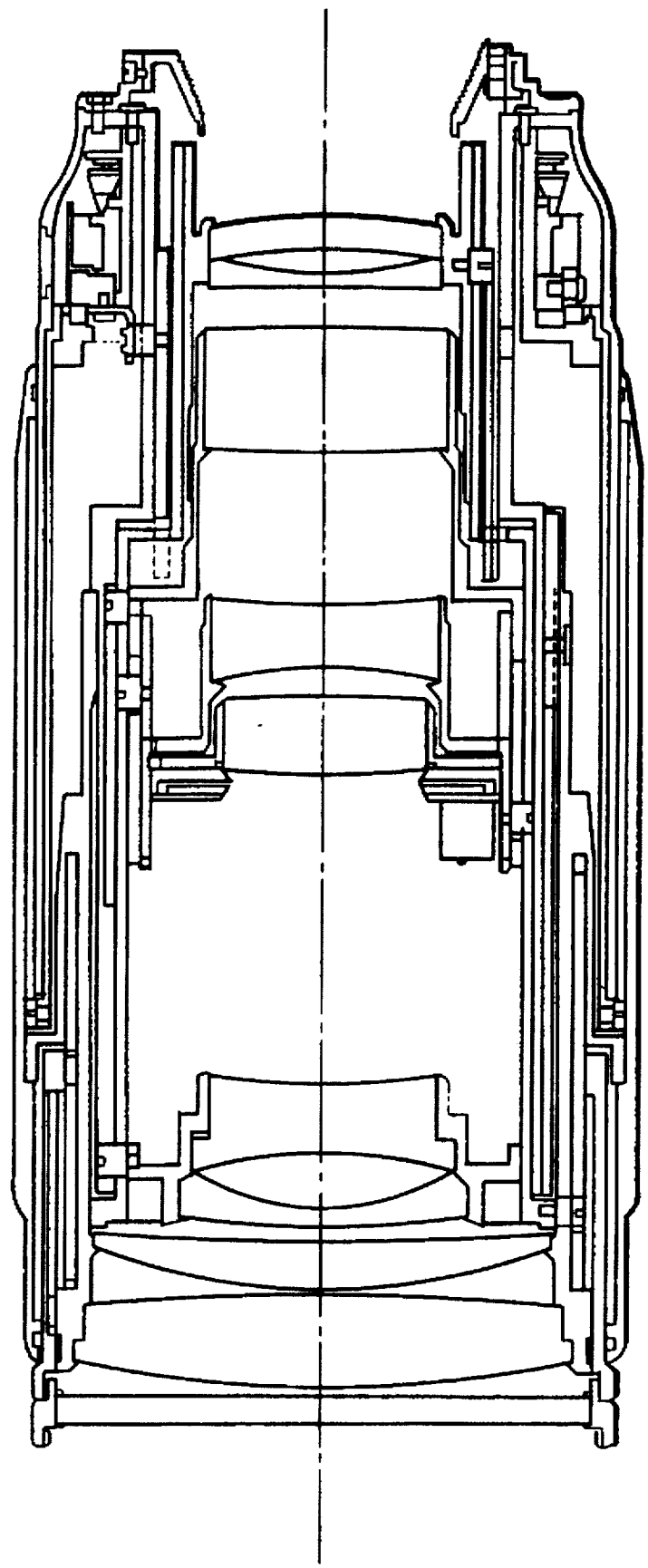
FIG. 2 is a cross-sectional view of the zoom lens barrel shown in FIG. 1 when the lenses are in a wide state.

FIGS. 1 through 10 show the first embodiment of the present invention. In FIGS. 1 through 9, reference character I denotes a first lens group; II, a second lens group; III, a third lens group; IV, a fourth lens group; V, a fifth lens group; and VI, a sixth lens group. The portion indicated by A in FIG. 1 is a removable filter.

In FIG. 1 reference character 1 denotes a fixed barrel; 1a, three outer straight grooves; 1b, three inner straight grooves; and 1c, three holes for retaining the second lens group II. The outer and inner straight grooves, and the holes are all formed at equal intervals. A peripheral hole 1i is formed in an outside diameter portion 1h. Reference character 2 denotes a mount secured by screws 2a to the fixed barrel 1. It retains a rear cover 3 and has removable stopper pins 2b. The fixed barrel 1 has an outer periphery 1e thereof which in turn has a distance window 4. A step 1f and a mating portion 1g are formed in an inner surface of the outer periphery 1e, and rotatably retain a rotary barrel 5. Two pins 5a opposite to each other at the front end of the rotary barrel 5 are screwed into an outer periphery of the rotary barrel 5. Three projections 5b are formed at a back inner periphery of the rotary barrel 5. Reference character 6 denotes a general portion of a focusing unit 6a secured by screws 6b to the fixed barrel 1.

Reference character 6c denotes a well-known ultrasonic motor; 6d, an output member; and 6e, a roller member. The roller member 6e is attached at equal intervals by three axial screws 6f to an outer periphery of a roller 6g so that the roller member 6e can rotate. An inside diameter portion of the roller 6g is mated with the focusing unit 6a so that the roller 6g can rotate. A distance graduation 6i is formed on the outer periphery of the roller 6g. Reference character 6h denotes an intermediate member mated with the focusing unit 6a. Three vertical mating grooves 6j are formed in an outer periphery of the intermediate member 6h, and are mated with the projections 5b formed at the back end of the inner periphery of the rotary barrel 5. This mating enables the intermediate member 6h to rotate together with the rotary barrel 5 for two turns. Reference character 6k denotes a pressure member which pressurizes by turns the ultrasonic motor 6c, the output member 6d, the roller member 6e and the intermediate member 6h, all of which components constitute the focusing unit 6a. Reference character 7 denotes a focus key secured by a screw 7a to the roller 6g in the focusing unit 6. A vertical mating groove 7b (not shown) is formed in the focus key 7.

Reference character 8 designates a focus communicating barrel mated with an inner periphery of the fixed barrel 1. A vertical groove 8b is formed in an inner periphery of the focus communicating barrel 8. A pin 8a is screwed in an outer periphery of the focus communicating barrel 8. The peripheral hole 1i bored in the outside diameter portion 1h of the fixed barrel 1 restricts the thrust of the pin 8a, and the vertical mating groove 7b (not shown) of the focus key 7 restricts the rotation of the pin 8a.

Reference character 9 designates a first lens barrel retaining the first lens group I. A mating portion 9a is formed at a back inner periphery of the first lens barrel 9, and is mated with the fixed barrel 1. Straight keys 9b are secured by screws 9c to the back inner periphery of the first lens barrel 9. The straight keys 9b are mated with the outer straight grooves 1a, thereby causing the first lens barrel 9 to move straight with respect to the fixed barrel 1. Three cam grooves 9d are formed at equal intervals in a front half portion of the first lens barrel 9. An outer mating portion of the first lens barrel 9 is mated with a hood cam barrel 10 so that the hood cam barrel 10 can rotate freely with respect to the first lens barrel 9. This outer mating portion restricts the thrust of the hood cam barrel 10.

Reference character 9e designates three joggles formed at equal intervals in the front outer periphery of the first lens barrel 9. Reference character 9f designates a collar extending toward the outer periphery of the first lens barrel 9. A mating portion 9g is formed at the periphery of the collar 9f. Three straight grooves 10a and another three cam grooves 10b are formed at equal intervals on the hood cam barrel 10.

Reference character 11 indicates an operating ring having a receiving portion 11a formed at an intermediate portion of an inner periphery thereof. The receiving portion 11a, together with the mating portion 9g, restricts the thrust of the operating ring 11 and the mating with the first lens barrel 9. This restriction makes it possible for the operating ring 11 to move back and forth with respect to the first lens barrel 9. Two vertical grooves 11b opposite to each other are formed in the inner periphery of the operating ring 11. These vertical grooves 11b are mated with the two pins 5a which are arranged opposite to each other at the front end of the rotary barrel 5, and which are screwed into the outer periphery of the rotary barrel 5. Because of such mating, the rotation of the operating ring 11 can be transmitted stably to the rotary barrel 5 and the intermediate member 6h in the focusing portion 6.

Reference character 12 designates a filter frame. A filter thread 12a is cut at a front inner periphery of the filter frame 12 so that the filter A can be screwed. A mating portion 12b is formed at a back inner periphery of the filter 12. Three joggles 12c are formed at equal intervals in an inner periphery of the mating portion 12b. Three vertical grooves 12d are formed at equal intervals in a middle inner periphery of the filter frame 12. The vertical grooves 12d are mated with the joggles 9e formed in the front outer periphery of the first lens barrel 9, thereby restricting the rotation of the first lens barrel 9. The mating portion 12b is mated with the outer periphery of the hood cam barrel 10, and at the same time, three joggles 12c are mated with the three cam grooves 10b on the hood cam barrel 10. As mentioned previously, the mating portion 12b is formed at the back inner periphery of the filter 12, and the joggles 12c are formed in the inner periphery of the mating portion 12b. Because of such mating, as the hood cam barrel 10 rotates, the filter frame 12 moves forward with respect to the first lens group I retained by the first lens barrel 9.

Figure 3:
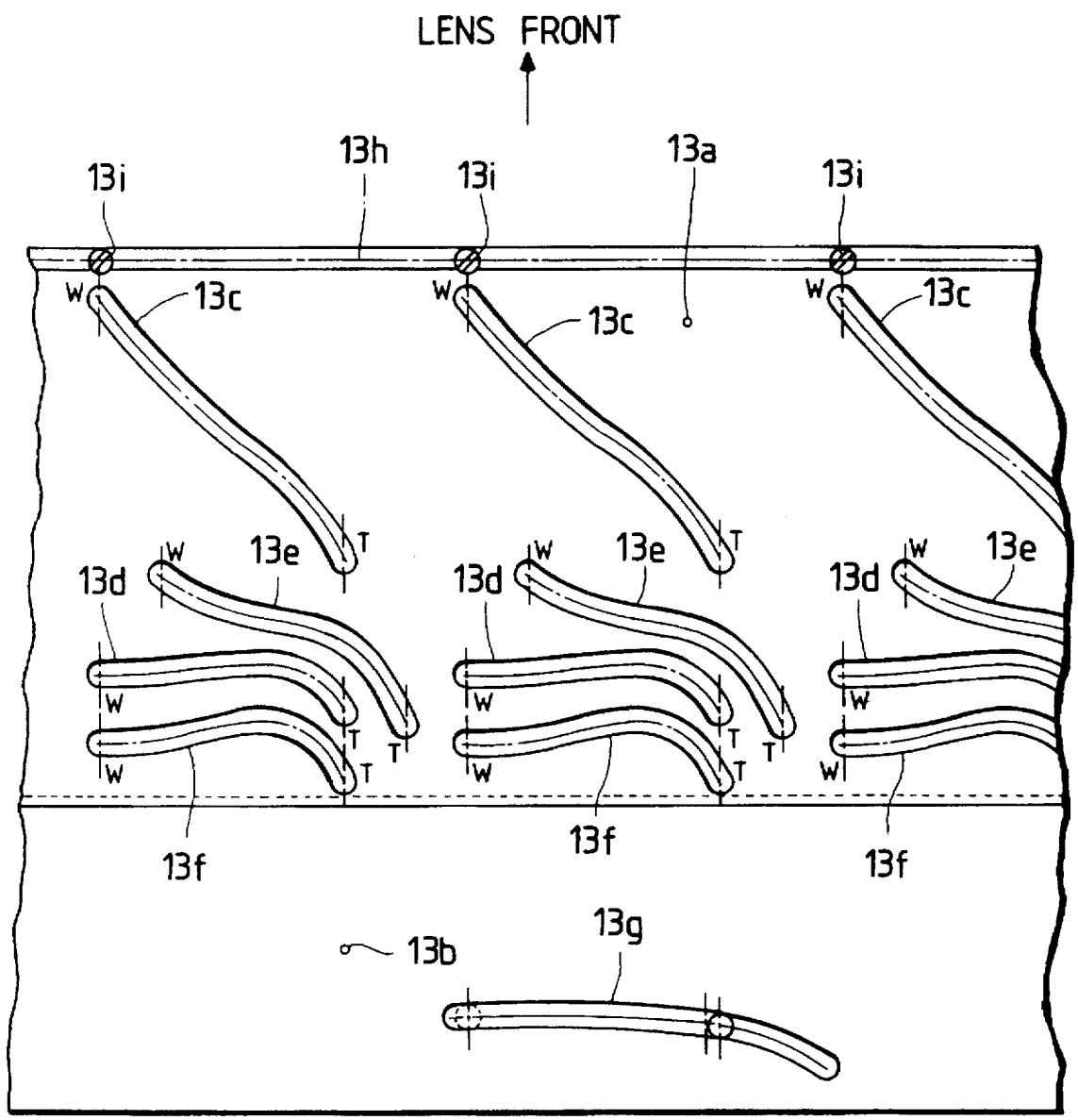
FIG. 3 is a developed view of a cam barrel shown in FIG. 1.
Figure 4:
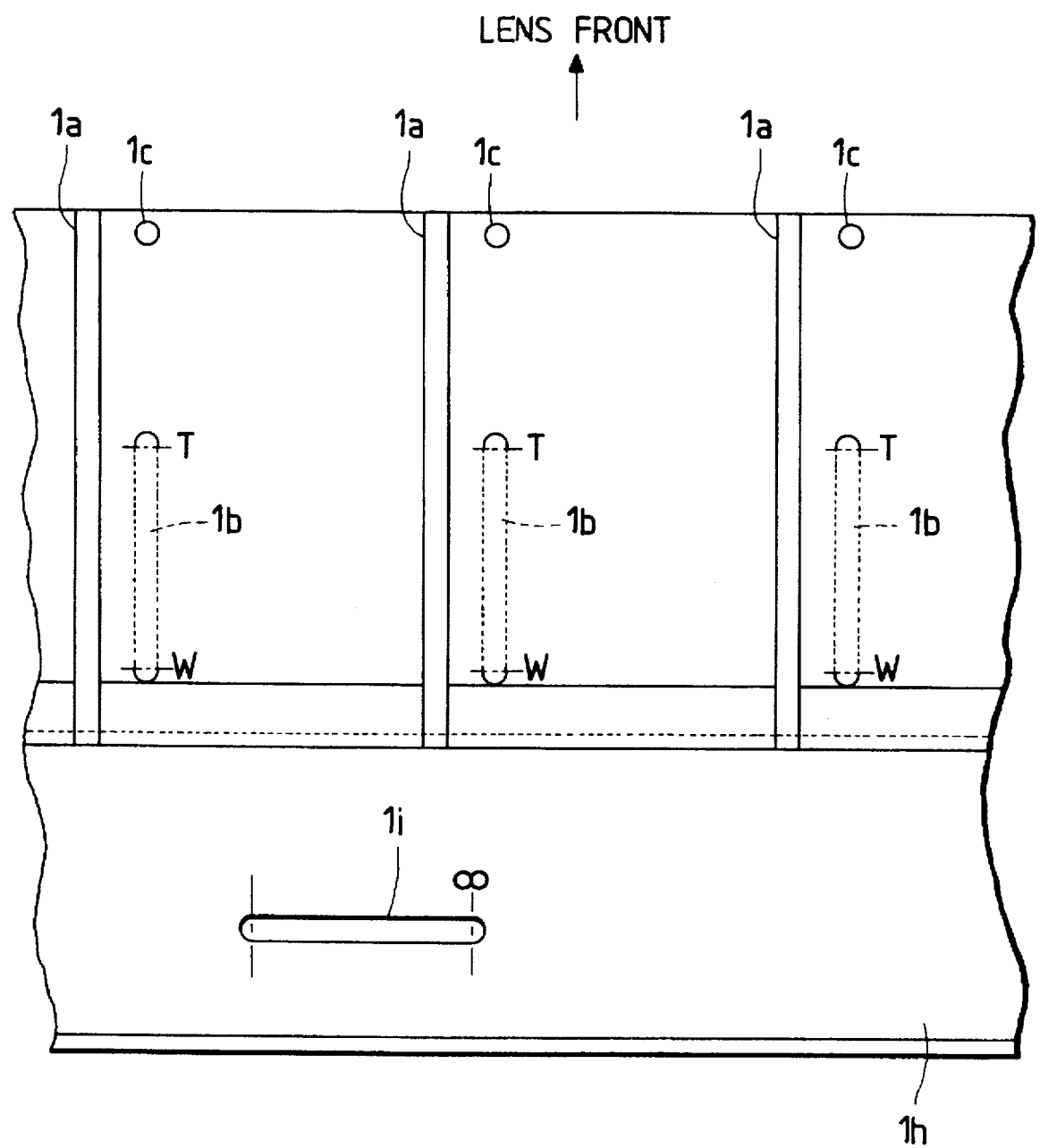
FIG. 4 is a developed view of a fixed barrel shown in FIG. 1.

Reference character 13 indicates a cam barrel composed of a large diameter portion 13a and a small diameter portion 13b. The large diameter portion 13 is mated with and retained by an inside diameter portion of the fixed barrel 1. As shown in FIG. 3, three fixed-pin cams 13c, three third cams 13d, three fourth cams 13e and three fifth cams 13f are formed all at equal intervals in the large diameter portion 13a. A focusing cam 13g is formed in the small diameter portion 13b. A mating portion 13h is formed at a front outer periphery of the cam barrel 13. It has a diameter larger than that of the cam barrel 13. Three mating pins 13i are screwed at equal intervals into an outer periphery of the mating portion 13h.

The mating pins 13i penetrate the cam grooves 9d of the first lens barrel 9 and are engaged with the straight grooves 10a of the hood cam barrel 10. Because of this engagement, the amount of rotation made by the cam barrel 13 restricts the amount of rotation made by the hood cam barrel 10, which in turn determines the amount of forward movement made by the filter frame 12, as described above.

Reference character 14 indicates a second lens barrel retaining the second lens group II. A mating portion 14a is formed in an outer periphery of the second lens barrel 14. Three fixing pins 14b are formed at equal intervals in the mating portion 14a. These pins 14b are engaged with the fixed-pin cams 13c formed in the large diameter portion 13a of the cam barrel 13, and are also engaged with the holes 1c, for retaining the second lens group II, which holes 1c are formed in the fixed barrel 1. Because of this engagement, the second lens barrel 14 remains stationary with respect to the fixed barrel 1. The shapes and the locations of the fixed-pin cams 13c and the cam grooves 9d determine the thrust position of the cam barrel 13 and the angle through which the cam barrel 13 rotates. The cam barrel 13 causes the operating ring 11 to move back and forth, and is thus moved forward rotatively.

Figure 5:
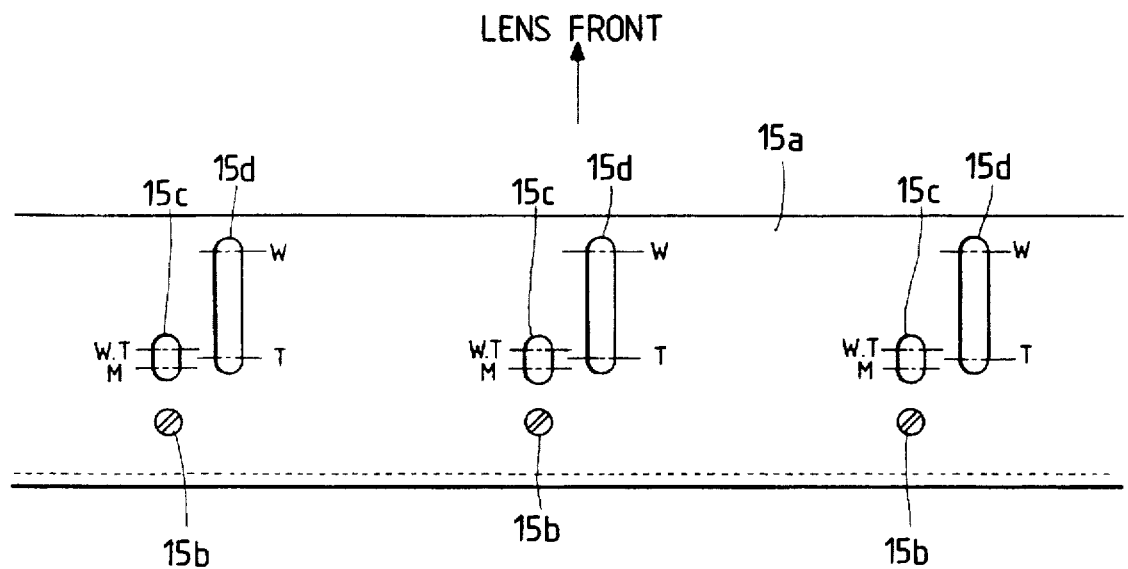
FIG. 5 is a developed view of a mating portion of a fixed lens barrel group.

Reference character 13j indicates a movable aperture secured to the front end of the cam barrel 13. Reference character 15 indicates a fifth lens barrel for retaining the fifth lens group V. The fifth lens barrel 15 has a mating portion 15a which is mated with and retained by the large diameter portion 13a of the cam barrel 13. As shown in FIG. 5, three fifth pins 15b are screwed into the mating portion 15a. Three third grooves 15c, three fourth grooves 15d are formed at equal intervals in the mating portion 15a. The fifth pins 15b are engaged with the fifth cams 13f, formed in the large diameter portion 13a of the cam barrel 13, and are also engaged with the inner straight grooves 1b of the fixed barrel 1. Because of this engagement, the rotative, forward movement of the cam barrel 13 permits the zoom lens barrel to move straight forward.

Reference character 16 indicates a well-known electromagnetic aperture unit.

Reference character 17 indicates a third lens barrel retaining the third lens group III and the electromagnetic aperture unit 16.

The third lens barrel 17 is mated with and retained by the fifth lens barrel 15. Third pins 17a are engaged with the third grooves 15c, formed in the mating portion 15a of the fifth lens barrel 15, and are also engaged with the third cams 13d, formed in the large diameter portion of the cam barrel 13. Because of this engagement, the rotative, forward movement of the cam barrel 13 permits the lenses to move straight.

Reference character 18 denotes a fourth lens barrel retaining the fourth lens group IV. The fourth lens barrel 18 is mated with and retained by the fifth lens barrel 15. Fourth pins 18a screwed into a mating portion of the fourth lens barrel 18 are engaged with the fourth grooves 15d, formed in the mating portion 15a of the fifth lens barrel 15, and are also engaged with the fourth cams 13e, formed in the large diameter portion of the cam barrel 13. Because of this engagement, the rotative and forward movement of the cam barrel 13 permits the lenses to move straight in the same manner as the third lens barrel 17.

Reference character 19 denotes a sixth lens barrel retaining the sixth lens group VI, which lens barrel 19 is mated with and retained by the inner periphery of the small diameter portion 13b of the cam barrel 13. A sixth pin 19a screwed into a mating portion of the sixth lens barrel 19 is engaged with the focusing cam 13g of the cam barrel 13 and the vertical groove 8b of the focus communicating barrel 8.

Figure 9:
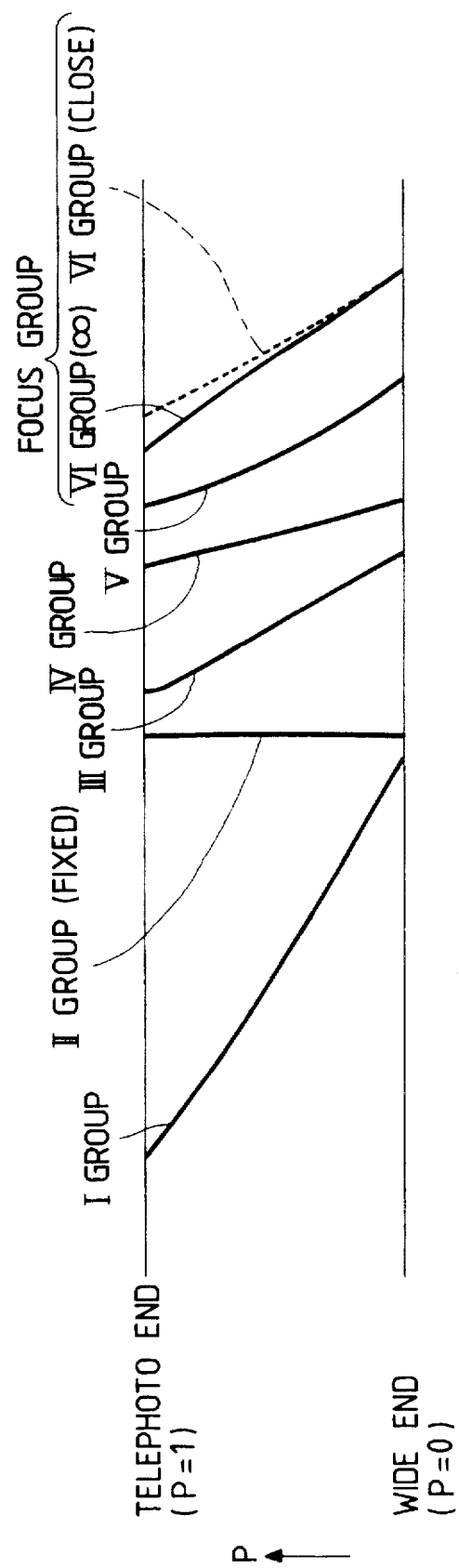
FIG. 9 is a diagram showing lines drawn by the movement of a zoom lens group illustrated in FIG. 1.

In FIG. 9, P indicates zoom parameters which change from zero (P=0) on the wide end to one (P=1) on the telephoto end.

The first lens group I moves forward in a substantially linear manner. The amounts of movement $Z_1(P)$ made by the first lens group I are expressed by the following equation using the function of the zoom parameters P.

$$Z_1(P) = -87.7291 \times P \quad \text{(equation 1)}$$
$$-5.9751 \times P^2$$
$$+38.227 \times P^3$$
$$-18.8765 \times P^4$$
$$-7.2885 \times P^5$$
$$+6.64197 \times P^6$$

The second lens group consists of fixed lenses. The third, fourth, fifth and sixth lens groups consist of movable lenses, all of which move in a nonlinear manner.

In this embodiment, because the sixth lens group VI serves as the focus lens group, the amounts of movement $Z_6(P)$ made by the sixth lens group IV to reach infinity are expressed by the following equation using the function of P in the same manner as the amounts of movement $Z_1(p)$ made by the first lens group I.

$$Z_6(P) = -52.2729 \times P \quad \text{(equation 2)}$$
$$+23.3911 \times P^2$$
$$+39.3588 \times P^3$$
$$-236.458 \times P^4$$
$$+530.4948 \times P^5$$
$$-580.5656 \times P^6$$
$$+292.4738 \times P^7$$
$$-56.326298 \times P^8$$

The amounts of movement made by the sixth lens group VI toward an object at an infinite distance and toward other objects at different distances are expressed by the following equations, where DX(P) indicates the amounts of movement made by the focused sixth lens group VI when values deriving from $Z_6(P)$ are considered as criteria for the above objects.

$$DX_{(P)}^{\infty} = 0 \quad \text{(equation 3)}$$

$$DX_{(P)}^{10m} = 0.048541255 \quad \text{(equation 4)}$$
$$+0.16812652 \times P$$
$$+0.34974622 \times P^2$$
$$+0.46356797 \times P^3$$
$$-0.0740180230 \times P^4$$
$$+2.83737350 \times P^5$$
$$-4.76278140 \times P^6$$
$$+5.50027880 \times P^7$$
$$-2.22196430 \times P^8$$

$$DX_{(P)}^{5m} = 0.0988010890 \quad \text{(equation 5)}$$
$$+0.34263702 \times P$$
$$+0.706005850 \times P^2$$
$$+0.857507810 \times P^3$$
$$+0.486142130 \times P^4$$
$$+3.78180260 \times P^5$$
$$-6.76691370 \times P^6$$
$$+9.04521350 \times P^7$$
$$-3.90948150 \times P^8$$

$$DX_{(P)}^{3.5m} = 0.143319050 \quad \text{(equation 6)}$$
$$+0.49750616 \times P$$
$$+1.01685820 \times P^2$$
$$+1.13980170 \times P^3$$
$$+1.47082140 \times P^4$$
$$+3.08519780 \times P^5$$
$$-6.29037660 \times P^6$$
$$+10.5275300 \times P^7$$
$$-5.16737120 \times P^8$$

$$DX_{(P)}^{2.6m} = 0.196421380 \quad \text{(equation 7)}$$
$$+0.682520480 \times P$$
$$+1.38218740 \times P^2$$
$$+1.40201600 \times P^3$$
$$+3.18587210 \times P^4$$
$$+0.552946600 \times P^5$$
$$-3.22240080 \times P^6$$
$$+10.4507290 \times P^7$$
$$-5.61543700 \times P^8$$

$$DX_{(P)}^{2m} = 0.260856040 \quad \text{(equation 8)}$$
$$+0.907314670 \times P$$
$$+1.81794550 \times P^2$$
$$+1.62177480 \times P^3$$
$$+5.97213570 \times P^4$$
$$-4.74771310 \times P^5$$
$$+3.77587490 \times P^6$$
$$+7.93172350 \times P^7$$
$$-5.74555960 \times P^8$$

-continued $$DX_{(P)}^{1.5m} = 0.358994040 \quad \text{(equation 9)}$$
$$+1.25004060 \times P$$
$$+2.46682720 \times P^2$$
$$+1.77421100 \times P^3$$
$$+11.5002260 \times P^4$$
$$-16.9023260 \times P^5$$
$$+20.4448820 \times P^6$$
$$-0.379385290 \times P^7$$
$$-4.63678140 \times P^8$$

$$DX_{(P)}^{1m} = 0.575488470 \quad \text{(equation 10)}$$
$$+1.97142940 \times P$$
$$+3.98074080 \times P^2$$
$$+4.58489030 \times P^3$$
$$+2.15385680 \times P^4$$
$$+21.8279620 \times P^5$$
$$-40.3965620 \times P^6$$
$$+51.3659280 \times P^7$$
$$-21.7564020 \times P^8$$

$$DX_{(P)}^{70cm} = 0.901905270 \quad \text{(equation 11)}$$
$$+3.06121860 \times P$$
$$+6.06886870 \times P^2$$
$$+7.03123610 \times P^3$$
$$+3.33171080 \times P^4$$
$$+25.0760880 \times P^5$$
$$-38.7647970 \times P^6$$
$$+50.1789960 \times P^7$$
$$-20.9403790 \times P^8$$

$$DX_{(P)}^{50cm} = 1.45026280 \quad \text{(equation 12)}$$
$$+4.85288590 \times P$$
$$+9.31607390 \times P^2$$
$$+10.2444070 \times P^3$$
$$+8.34099680 \times P^4$$
$$+13.4401970 \times P^5$$
$$-1.71919980 \times P^6$$
$$+10.7024390 \times P^7$$
$$-3.27838780 \times P^8$$

Figure 10:
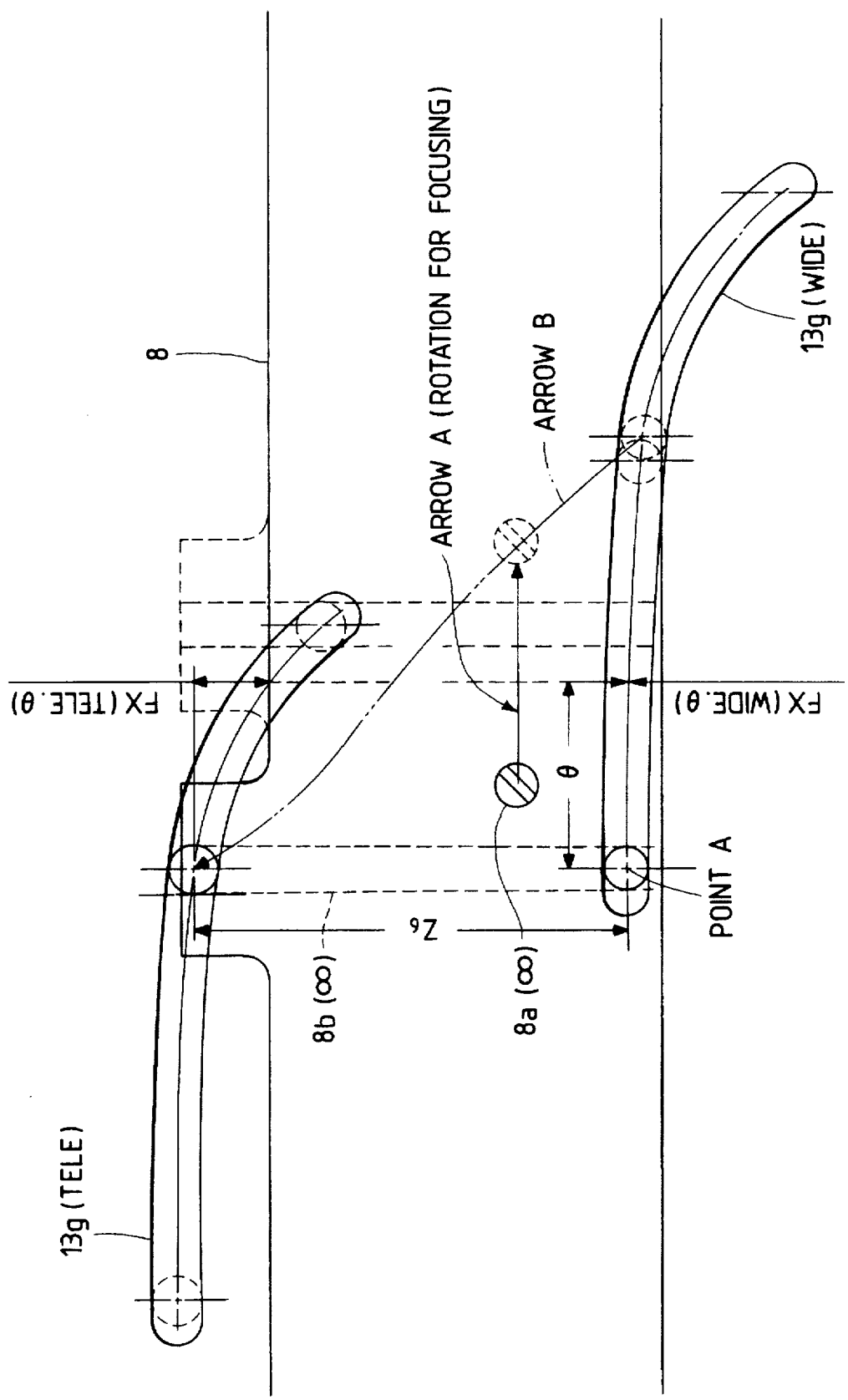
FIG. 10 is a detailed view showing how a focusing cam in the first embodiment operates.

FIG. 10 is a detailed view which shows the focus communicating barrel 8 and the focusing cam 13g on the wide and telephoto ends. The focusing cam 13g is disposed in the small diameter portion 13b of the cam barrel 13. Arrow A indicates the course in which the focus communicating barrel 8 moves from infinity to the closest point of focus. Arrow B indicates the course in which the focusing cam 13 moves from the wide end to the telephoto end. The length of arrow B is equal to the length of the fixed-pin cam 13c disposed in the large diameter portion 13a of the cam barrel 13.

In FIG. 10 symbol θ indicates a rotation angle when the focus is at infinity; FX(wide, θ) indicates the amount of movement made by the zoom lens barrel on the wide end for focusing; FX(tele, θ) indicates the amount of movement made by the zoom lens barrel on the telephoto end for focusing; point A is used as an origin for describing the shape of the cam; and a length denoted by Z6 indicates the amount of movement made by the sixth lens group set at infinity.

As obvious from FIG. 10, the closer the zoom lenses approach the telephoto end, the more the focus movement increases.

[Description of shape of focusing cam]

In FIG. 10 point A corresponds to an infinite focus position on the wide end, and is regarded as the origin. It is assumed that values in the right-hand direction to point A are positive parameters, that the infinite position on the telephoto end is abscissas when P=1, and that positive values are given in the direction in which light passes from point A (in a lower direction of the drawing). Then cam ordinates DF(P) are expressed by the following equation.

$$DF(P) = -0.16483574 \times P \quad \text{(equation 13)}$$
$$+0.23411311 \times P^2$$
$$+1.0812920 \times P^3$$
$$-3.0355993 \times P^4$$
$$+6.0473302 \times P^5$$
$$-4.0403452 \times P^6$$
$$+1.3991619 \times P^7$$

[Description of zooming operation]

In the above construction, as mentioned above, when the operating ring 11 is moved forward for zooming from the wide end to the telephoto end, the first lens barrel 9 moves straight in the same amount as the operating ring 11. At the same time, the cam barrel 13 moves forward rotatively. For this reason, the filter frame 12 moves straight in a forward direction with respect to the first lens barrel 9. The rotative, forward movement of the first lens barrel 9 causes the third, fourth and fifth lens barrels 17, 18 and 15 to move straight simultaneously.

On the other hand, the vertical groove 8b formed on the focus communicating barrel 8, communicating with the focus key, restricts the rotation of the sixth lens barrel. Because of this restriction, the sixth lens barrel moves straight.

[Description of focusing operation]

A rotation angle θ for focusing has positive values in this embodiment (this is called a wide starting cam). The amount of forward movement DF(P, θ) is determined by the amount of a change from (P) to (P+θ) in cam ordinates DF(P), where P is the amount of zooming, and θ is the rotation angle for focusing. Thus the amount of forward movement DF(P, θ) is expressed by the following equation:

$$DF(P, \theta) = DF(P+\theta) - DF(P)$$

For example, if P=1, that is, when the amount of forward movement DX(1) xm on the telephoto end is equal to DF(1,0), where xm is a given camera-to-object distance, then an object is focused on the telephoto end. When zooming is changed from P=1 to P=1 without altering the rotation angle θ at this phase (that is, while the focus is fixed), the amount the cam deviates $^\Delta DX(P)$xm is expressed as follows:

$$^\Delta DX(P) = DF(P, \theta) - DX(1)xm \quad \text{(equation 15)}$$

The focusing cam 13g, expressed by equation 13 mentioned above, is determined so that $^\Delta DX(P)$ always assumes zero (between P=0 and P=1).

Second embodiment

Figure 11:
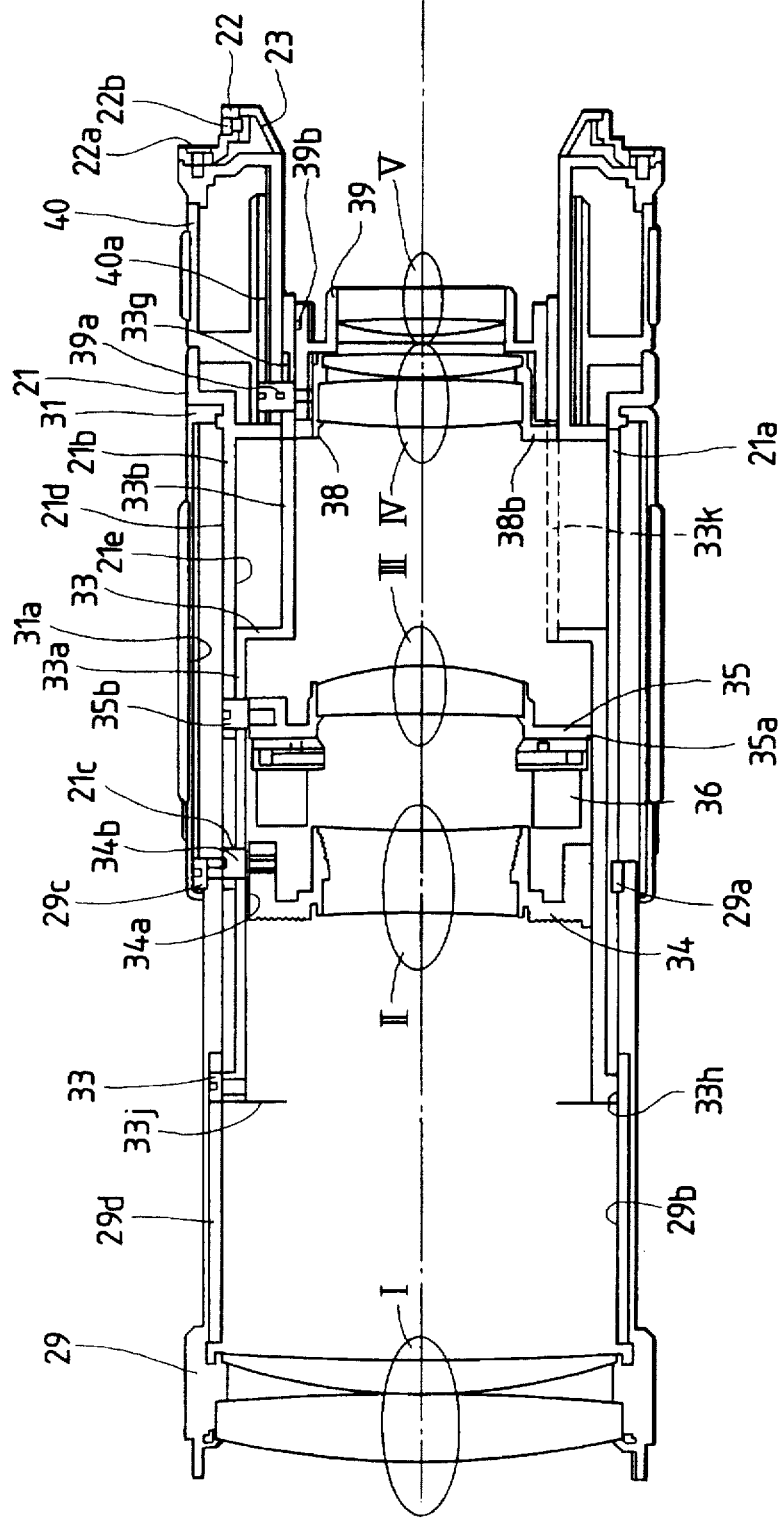
FIG. 11 is a cross-sectional view showing a zoom lens barrel according to a second embodiment of this invention when lenses are in a telephoto state.
Figure 12:
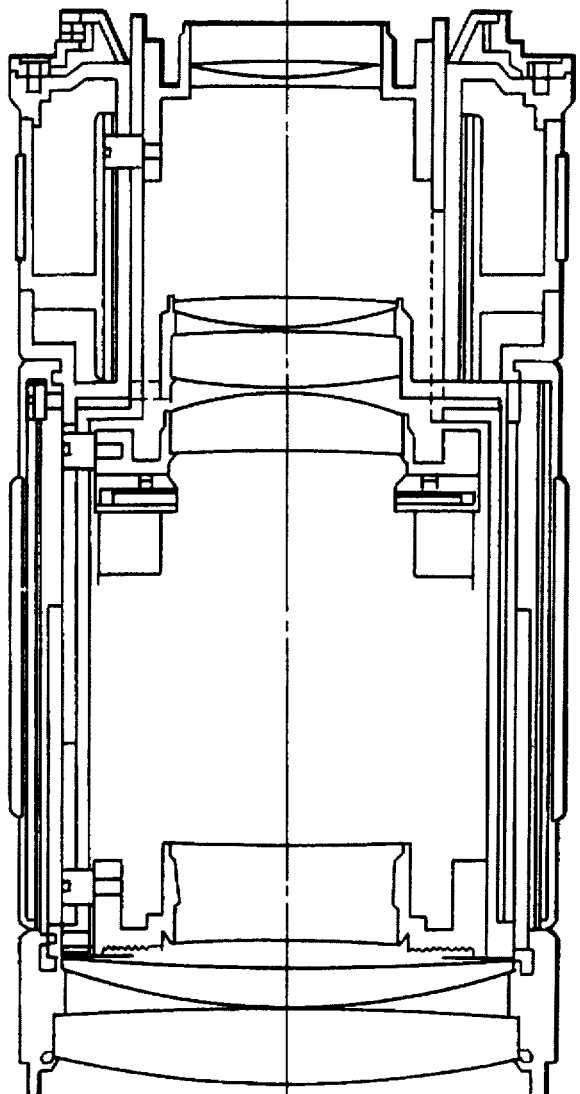
FIG. 12 is a cross-sectional view of the zoom lens barrel shown in FIG. 11 when the lenses are in a wide state.
Figure 13:
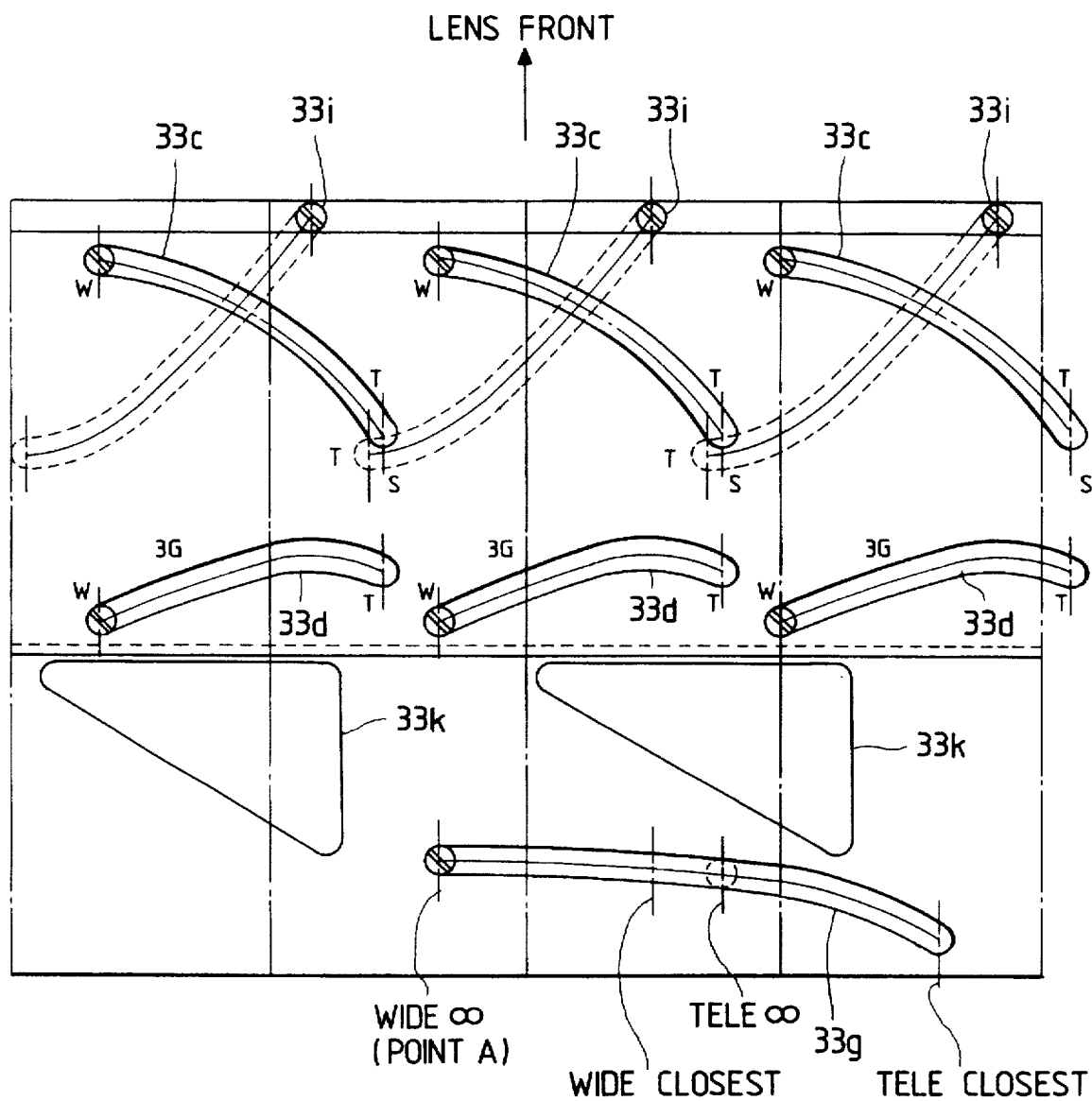
FIG. 13 is a developed view of a cam in the second embodiment.
Figure 14:
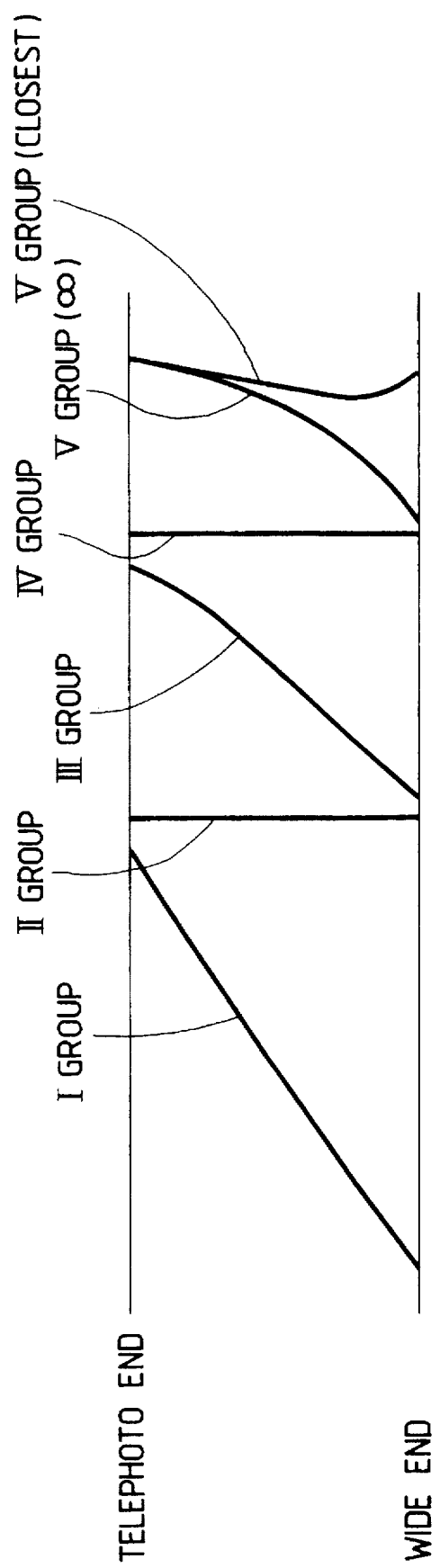
FIG. 14 is a diagram showing lines drawn by the movement of a zoom lens group in the second embodiment.

FIGS. 11 through 14 show the second embodiment of this invention. FIG. 11 is a cross-section view showing a zoom lens barrel when lenses are in a telephoto state; FIG. 12 is a cross-sectional view of the zoom lens barrel when the lenses are in a wide state; FIG. 13 is a developed view of a first lens barrel and a cam barrel; and FIG. 14 is a diagram showing lines drawn by the movement of a zoom lens group.

In FIGS. 11 through 14, reference character I denotes a first lens group; II, a second lens group; III, a third lens group; IV, a fourth lens group; and V, a fifth lens group.

In these drawings, reference character 21 denotes a fixed barrel; 21a, three outer straight grooves; 21b, three straight grooves; and 21c, three holes for retaining the second lens group II. These grooves and holes are all formed at equal intervals. Reference character 21d denotes an outer mating portion, and 21e denotes an inner mating portion. Reference character 22 denotes a mount secured by a screw 22a to the fixed barrel 21. It retains a rear cover 23, and has a removable stopper pin 22b.

Reference character 29 denotes a fifth lens barrel. Three keys 29a and another three mating pins 39c are secured to a back end of the first lens barrel 29. A mating portion 29b and three cam grooves 29d are formed in an inner periphery of the first lens barrel 29. The mating portion 29b is mated with the outer mating portion 21d of the fixed barrel 21. At the same time, the keys 29a are mated with the outer straight grooves 21a of the fixed barrel 21.

Reference character 31 denotes a zoom operating ring. A back end of the zoom operating ring 31 is rotatably retained by the fixed barrel 21. Lead grooves 31a are formed in an inner periphery of the zoom operating ring 31, and are engaged with the mating pins 29c secured to the back end of the first lens barrel 29. For this reason, the rotation of the zoom operating ring 31 causes the first lens barrel 29 to move back and forth.

Reference character 33 denotes a cam barrel. A large diameter portion 33a and a small diameter portion 33b are formed on the cam barrel 33. The large diameter portion 33a is mated with and retained by an inside diameter portion of the fixed barrel 21. Three fixed-pin cams 33c for zooming and three third cams 13d are formed at equal intervals in the large diameter portion 33a. Two notches 33k opposite to each other and a focusing cam 33g for focusing as well as zooming are formed in the small diameter portion 33b. A front periphery of the cam barrel 33 has a diameter larger than other portions thereof. A mating portion 33h is formed in the front periphery of the cam barrel 33, and is mated with the mating portion 29b formed in the inner periphery of the first lens barrel 29. Three mating pins 33i are screwed at equal intervals into the mating portion 33h, and are engaged with the cam grooves 29d of the first lens barrel 29.

Reference character 34 denotes a second lens barrel retaining the second lens group II. An outer periphery 34a is formed on the second lens barrel 34. Three fixing pins 34b are formed at equal intervals in the outer periphery 34a. These pins 34b are engaged with the fixed-pin cams 33c disposed in the large diameter portion 33a of the cam barrel 33, and are also engaged with the holes 21c, for retaining the second lens group II, formed in the fixed barrel 21. Because of such engagement, the second lens barrel 34 remains stationary with respect to the fixed barrel 21.

The shapes of the cam grooves 29d and the fixed-pin cams 33c determine the location of the cam barrel 33. This location in turn determines the thrust position of the cam barrel 33 and the angle through which the cam barrel 33 rotates. As mentioned previously, the cam grooves 29d are formed in the inner periphery of the first lens barrel 29, and the fixed-pin cams 33c are disposed in the large diameter 33a of the cam barrel 33. The rotation of the zoom operating ring 31 causes the cam barrel 33 to move forward rotatively.

Reference character 33j designates a movable aperture secured to the front end of the cam barrel 33.

Reference character 35 designates a third lens barrel retaining the third lens group III. An outer periphery 35a is formed on the third lens barrel 35. Three third pins 35b are screwed at equal intervals into the outer periphery 35a. These pins 35b are engaged with the outer straight grooves 21b of the fixed barrel 21 and with third cams 33d disposed in the large diameter portion 33a of the cam barrel 33. Because of this engagement, the rotative, forward movement of the cam barrel 33 causes the zoom lens barrel to move for zooming in a predetermined manner.

Reference character 36 designates a well-known electro-magnetic aperture unit secured to the third lens barrel 35.

Reference character 38 designates a fourth lens barrel retaining the fourth lens group IV. Two connecting portions 38b are formed in an outer periphery of the fourth lens barrel 38. The connecting portions 38b penetrate the two notches 33k opposite to each other, and are secured to the fixed barrel 21.

Reference character 39 designates a fifth lens barrel retaining the fifth lens group V. A mating portion 39b is formed in an outer periphery of the fifth lens barrel 39. The mating portion 39b is mated with the small diameter portion 33b of the cam barrel 33 so that it can rotate and move back and forth. A fifth pin 39a is screwed into the mating portion 39b of the fifth lens barrel 39, and is mated with the focusing cam 3g disposed in the small diameter portion 33b of the cam barrel 33.

Reference character 40 designates a focus ring capable of rotating with respect to the fixed barrel 21. A vertical groove 40a is formed in an inner periphery of the focus ring 40, and is engaged with the fifth pin 39a. For this reason, the vertical groove 40a restricts the direction in which the fifth lens barrel 39 rotates. The shape of the focusing cam 3g disposed in the small diameter portion 33b of the cam barrel 33 restricts the direction of an optical axis.

[Description of movement made by lens groups]

In FIG. 14 the first lens group moves forward in a substantially linear manner, whereas the third and fifth lens groups move forward in a nonlinear manner. The second and fourth lens groups consist of fixed lenses.

In the second embodiment, because the fifth lens group serves as the focus group, the amounts of movement $Z_1$ (P) made by the fifth lens group to reach infinity are expressed by the following equation using the function of the zoom parameters P, which change from "0" on the wide end (P=0) to "1" on the telephoto end (P=0) in the same manner as in the first embodiment.

$$Z_1(P) = -6.6402784 \times P \quad \text{(equation 16)}$$
$$- 6.2457786 \times P^2$$
$$- 4.8648886 \times P^3$$
$$- 4.0360802 \times P^4$$
$$+ 3.5570434 \times P^5$$
$$- 9.3697193 \times P^6$$
$$+ 7.4239084 \times P^7$$
$$- 2.7577966 \times P^8$$

The amounts of movement made by the fifth lens group V toward an object at an infinite distance and toward other objects at different distances are expressed by the following equations, where DX(P) is the amounts of movement made by the focused fifth lens group V when values deriving from $Z_5(P)$ are considered as criteria for the above objects.

$$DX_{(P)}^{\infty} = 0 \qquad \text{(equation 17)}$$

$$\begin{aligned}DX_{(P)}^{15} = \; & 0.105202790 \\ & + 0.15103508 \times P \\ & + 0.18533758 \times P^2 \\ & + 0.12332529 \times P^3 \\ & + 0.29572441 \times P^4 \\ & - 0.606575480 \times P^5 \\ & + 1.1277088 \times P^6 \\ & - 0.90045948 \times P^7 \\ & + 3.2664222 \times P^8\end{aligned} \qquad \text{(equation 18)}$$

$$\begin{aligned}DX_{(P)}^{5m} = \; & 3.2150098 \\ & + 0.460627350 \times P \\ & + 0.56440706 \times P^2 \\ & + 0.37997774 \times P^3 \\ & + 0.83435378 \times P^4 \\ & - 1.6393248 \times P^5 \\ & + 3.0846574 \times P^6 \\ & - 2.4621910 \times P^7 \\ & + 0.89851538 \times P^8\end{aligned} \qquad \text{(equation 19)}$$

$$\begin{aligned}DX_{(P)}^{3m} = \; & 0.54603253 \\ & + 0.78069459 \times P \\ & + 0.95501162 \times P^2 \\ & + 0.6492790 \times P^3 \\ & + 1.37097204 \times P^4 \\ & - 2.4553786 \times P^5 \\ & + 4.6811459 \times P^6 \\ & - 3.7345373 \times P^7 \\ & + 1.3709268 \times P^8\end{aligned} \qquad \text{(equation 20)}$$

$$\begin{aligned}DX_{(P)}^{2m} = \; & 0.83901454 \\ & + 1.1963766 \times P \\ & + 1.4601576 \times P^2 \\ & + 1.0024998 \times P^3 \\ & + 1.8275554 \times P^4 \\ & - 3.2128387 \times P^5 \\ & + 6.2362899 \times P^6 \\ & - 4.9705821 \times P^7 \\ & + 1.8378508 \times P^8\end{aligned} \qquad \text{(equation 21)}$$

$$\begin{aligned}DX_{(P)}^{1.5m} = \; & 1.1466485 \\ & + 1.6305115 \times P \\ & + 1.9849380 \times P^2 \\ & + 1.3728294 \times P^3 \\ & + 2.2747954 \times P^4 \\ & - 3.7265567 \times P^5 \\ & + 6.8872410 \times P^6 \\ & - 5.4860398 \times P^7 \\ & + 2.0358451 \times P^8\end{aligned} \qquad \text{(equation 22)}$$

[Description of shape of focusing cam]

In the same way as in the first embodiment, cam coordinates DF(P) are expressed with respect to the zoom parameter P by the following equation, where an infinite focus position on the wide end is regarded as an origin.

$$\begin{aligned}DF(P) = \; & 0.65210923 \times P \\ & + 0.97135732 \times P^2 \\ & - 1.9561500 \times P^3 \\ & + 5.2135178 \times P^4 \\ & - 5.5995378 \times P^5 \\ & + 3.2812901 \times P^6 \\ & - 6.6526470 \times P^7\end{aligned} \qquad \text{(equation 23)}$$

[Description of zooming and focusing]

When the zoom operating ring 31 is rotated from the wide end to the telephoto end for zooming, the first and third lens groups move forward, whereas the second and fourth lens groups remain stationary.

In the same manner as in the first embodiment, when a zooming operation is performed, because the focus ring 40 is stationary, the fifth lens group V moves straight forward along the vertical groove 40a in the inner periphery of the focus ring 40. The fixed-pin cams 33c, disposed in the large diameter portion 33a, and the focusing cam 33g, disposed in the small diameter portion 33b of the cam barrel 33, determine the amount of movement made by the fifth lens group V at this phase in the same way as in the first embodiment.

As explained above, even when a zoom lens barrel of an internal focusing type is employed in which a first lens group moves, the amount of forward movement made by the first lens group increases. Such a construction of the zoom lens barrel makes it to reduce the number of components thereof.

The first lens group is moved for zooming in the direction of the optical axis. In response to such movement, a cam member is rotated and moved in the direction of the optical axis. A zooming cam performs zooming and corrects the amount of defocus while the zooming operation is performed, and the focusing cam performs focusing. Because of such a construction, the above embodiments make it possible to provide a compact zoom lens barrel in which the number of components thereof is reduced.

It is possible to provide a compact zoom lens barrel of high magnification, particularly when the first lens group close to an object is moved in the direction of the optical axis for zooming, thereby moving the cam member.

Third embodiment

The third embodiment of this invention will be described with reference to FIG. 15 and Table 1.

Figure 15:
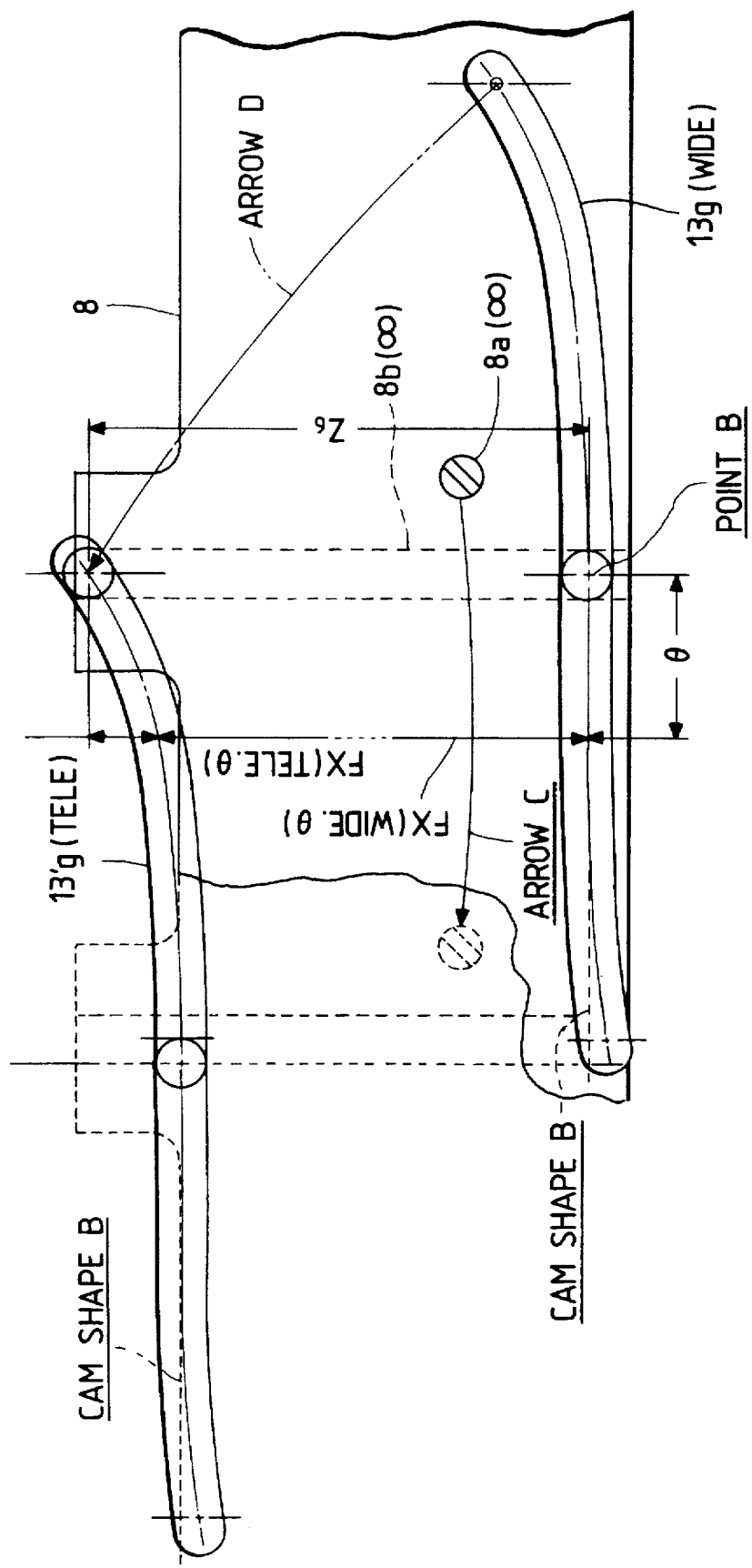
FIG. 15 is a detailed view showing how a focusing cam in a third embodiment operates.

FIG. 15 is a detailed view which shows a focus communicating barrel 8 and a focusing cam 13g on the wide and telephoto end. The focusing cam 13g is disposed in a small diameter portion 13b of the cam barrel 13. Arrow C indicates the course in which the focus communicating barrel 8 moves from infinity to the closest point of focus. Arrow D indicates the course in which the focusing cam 13 moves from the wide end to the telephoto end. The length of arrow D is equal to the length of a fixed-pin cam 13c disposed in a large diameter portion 13a of the cam barrel 13.

Figure 6:
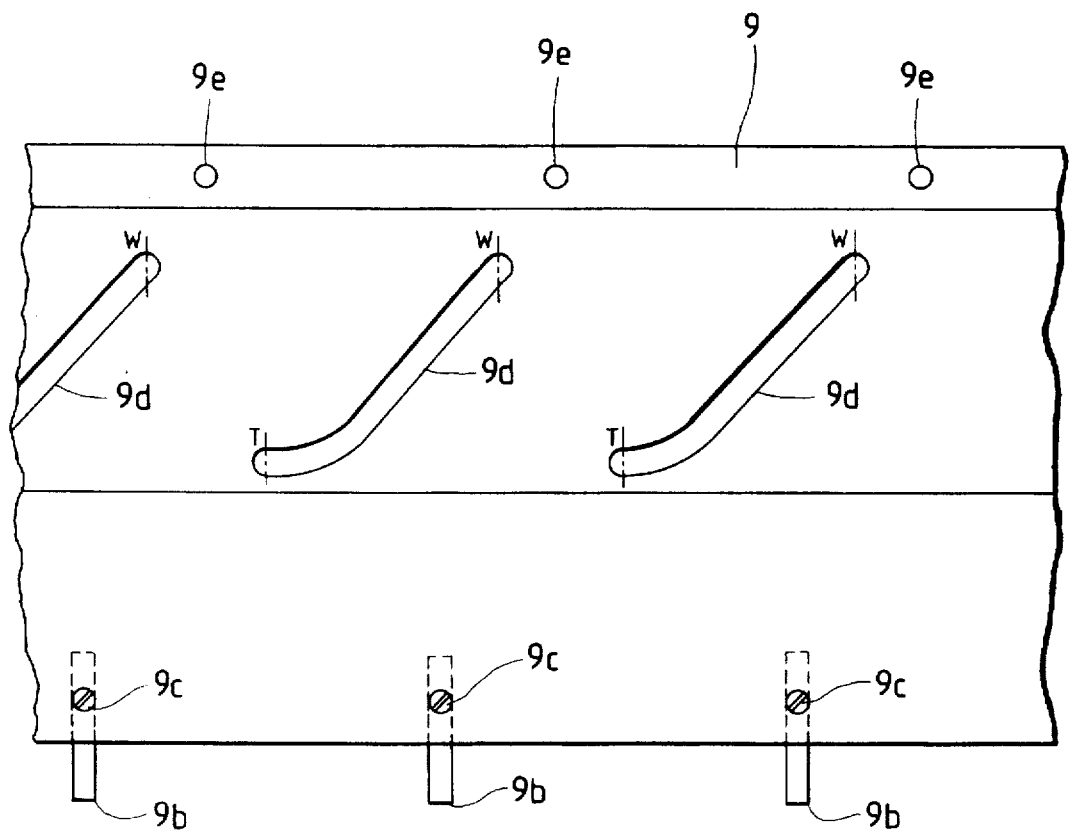
FIG. 6 is a developed view of a first lens barrel group shown in FIG. 1.
Figure 7:
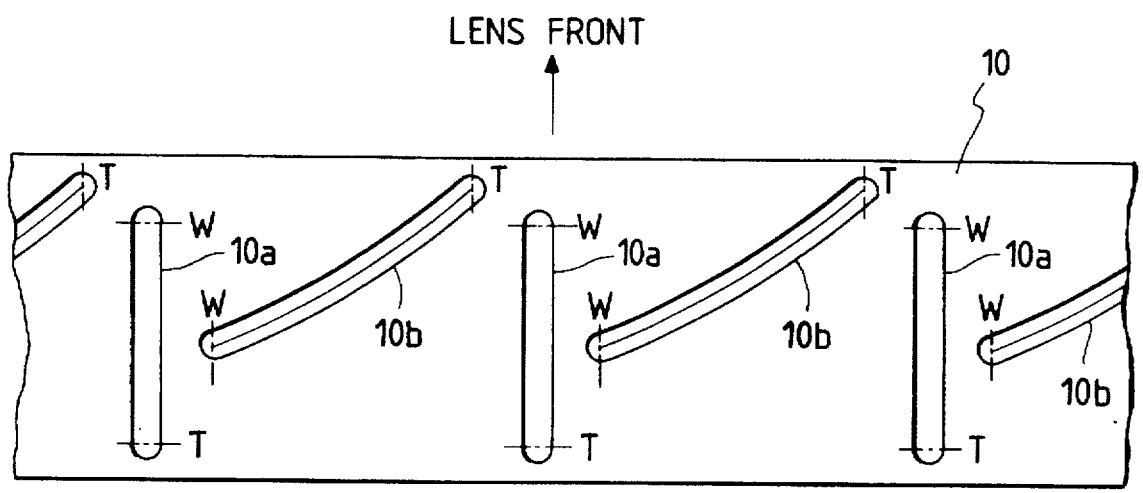
FIG. 7 is a developed view of a hood cam barrel shown in FIG. 1.
Figure 8:
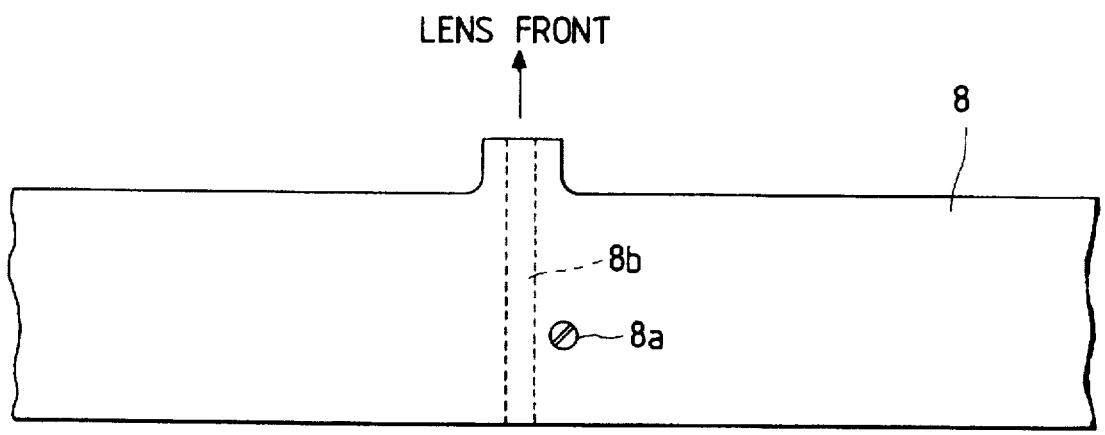
FIG. 8 is a developed view of a focus communicating barrel shown in FIG. 1.
Figure 19:
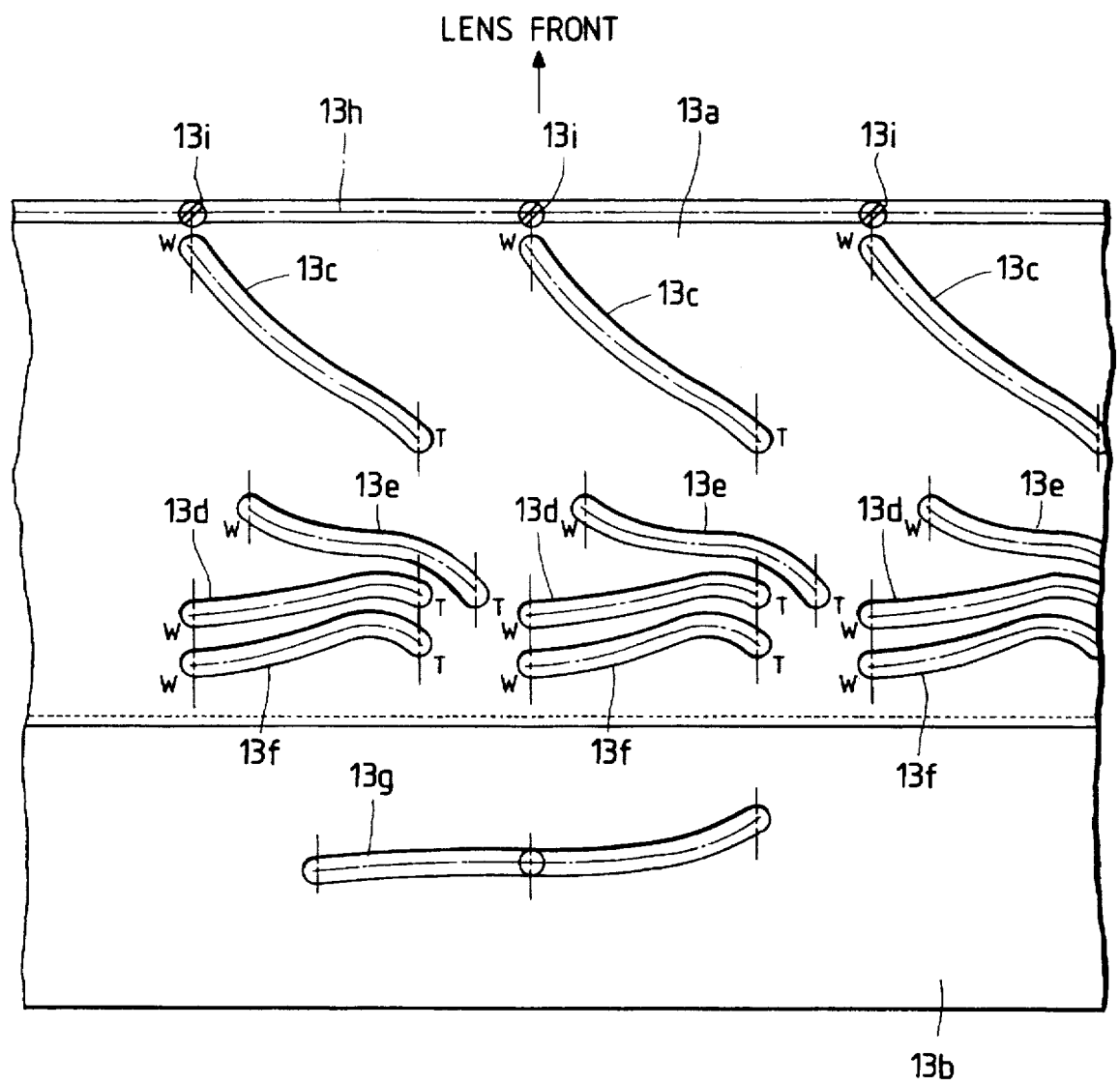
FIG. 19 is a developed view of a cam barrel in the third embodiment.
Figure 20:
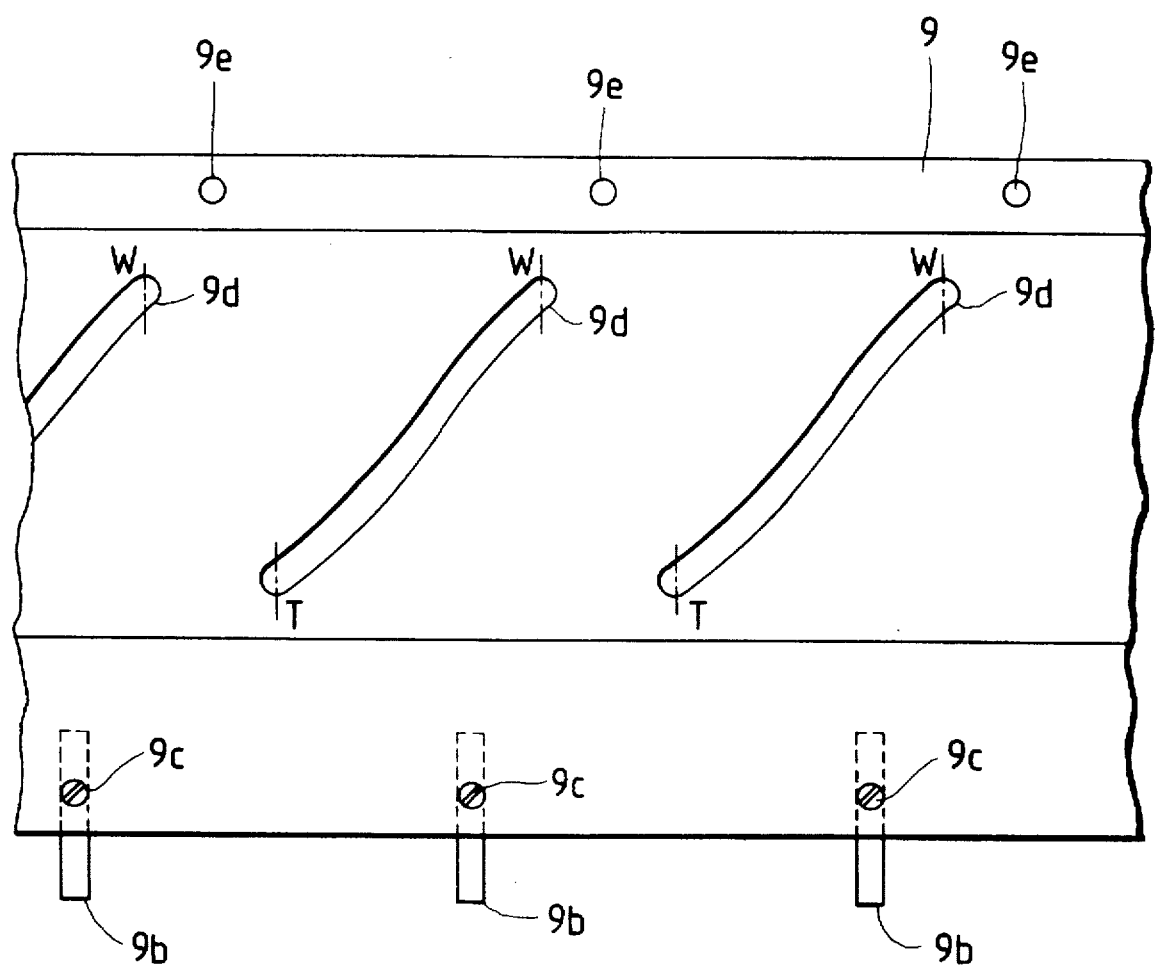
FIG. 20 is a developed view of a first lens barrel group in the third embodiment.

The third embodiment differs from the first embodiment, as shown in FIGS. 19, 20 and 15, which correspond to FIGS. 3, 6 and 10 in the first embodiment, respectively.

In FIG. 15 symbol θ indicates a rotation angle when the focus is at infinity; FX(wide, θ) indicates the amount of movement made by the zoom lens barrel on the wide end for focusing; FX(tele, θ) indicates the amount of movement made by the zoom lens barrel on the telephoto end for focusing; point B is used as an origin for describing the shape of the cam; the shape B of the cam indicates its shape before it is corrected; and a length denoted by Z6 indicates the amount of movement made by the sixth lens group set at infinity.

As obvious from FIG. 15, the closer the zoom lenses approach the telephoto end, the more the focus movement increases.

[Description of shape of focusing cam]

In FIG. 15 point B corresponds to an infinite focus position on the wide end, and is regarded as the origin. It is assumed that values in the right-hand direction to point B are positive parameters, and that the infinite position on the telephoto end is abscissas when P=1. It is also assumed that positive values are given in the direction in which light passes from point B (in a lower direction of the drawing). Cam ordinates DF(P) are expressed by the following equation.

$$DF(P) = -0.61387832 \times P \quad \text{(equation 24)}$$
$$-1.0218228 \times P^2$$
$$-1.1237228 \times P^3$$
$$-2.7742780 \times P^4$$
$$-1.3559715 \times P^5$$
$$+3.8409674 \times P^6$$
$$-4.4016533 \times P^7$$
$$-2.9247311 \times P^8$$
$$+3.0573613 \times P^9$$

The shape B of the cam before it is corrected is expressed as follows:

$$DF(P) = -0.587895 \times P \quad \text{(equation 24')}$$
$$-1.083093 \times P^2$$
$$-1.627202 \times P^3$$
$$-1.503167 \times P^4$$
$$-0.043344 \times P^5$$
$$-0.994588 \times P^6$$
$$-2.833623 \times P^7$$
$$+0.000983 \times P^8$$
$$-1.354200 \times P^9$$

[Description of zooming operation]

In the above construction, when an operating ring 11 is moved forward for zooming from the wide end to the telephoto end, a first lens barrel 9 moves straight in the same amount as the operating ring 11. At the same time, the cam barrel 13 moves forward rotatively. For this reason, a filter frame 12 moves straight in a forward direction with respect to the first lens barrel 9. The rotative, forward movement of the first lens barrel 9 causes third, fourth and fifth lens barrels 17, 18 and 15 to move straight simultaneously. On the other hand, a vertical groove 8b formed on the focus communicating barrel 8, communicating with the focus key, restricts the rotation of the sixth lens barrel. Because of this restriction, the sixth lens barrel moves straight.

[Description of focusing operation]

A rotation angle θ for focusing has negative values in this embodiment (this is called a telephoto starting cam). The amount of forward movement DF(P, θ) is determined by the amount of a change from (P) to (P+θ) in cam coordinates DF(P), where P is the amount of zooming, and θ is the rotation angle for focusing. Thus the amount of forward movement DF(P, θ) is expressed by the following equation:

$$DF(P, \theta) = DF(P+\theta) - DF(P) \quad \text{(equation 25)}$$

For example, if P=1, that is, when the amount of forward movement $DX_{(1)}^{xm}$ on the telephoto end is equal to DF(1,θ), where xm is a given camera-to-object distance, then an object is focused on the telephoto end. When zooming is changed from P=1 to P=0 without altering the rotation angle θ at this phase (that is, while the focus is fixed), the amount the cam deviates $$\Delta DX_{(P)}^{xm}$$

is expressed as follows:

$$\Delta DX_{(P)}^{xm} = DF(P, \theta) - DX_{(1)}^{xm} \quad \text{(equation 26)}$$

As shown in FIG. 15, the shape A of the cam is a shape before it is corrected where $^\Delta DX(P)$ always assumes zero (between P=0 and P=1). In this embodiment, in the same manner as the focusing cam 13g in FIG. 15, if the amount of movement made by a focus lens group for zooming increases on the wide end and in a region where the rotation angle for focusing increases, then the closest camera-to-object distance can be used as a camera-to-object distance for an object in a close range.

Table 1 shows zoom parameters and camera-to-object distances at rotation angles θ for focusing.

Figure 17:
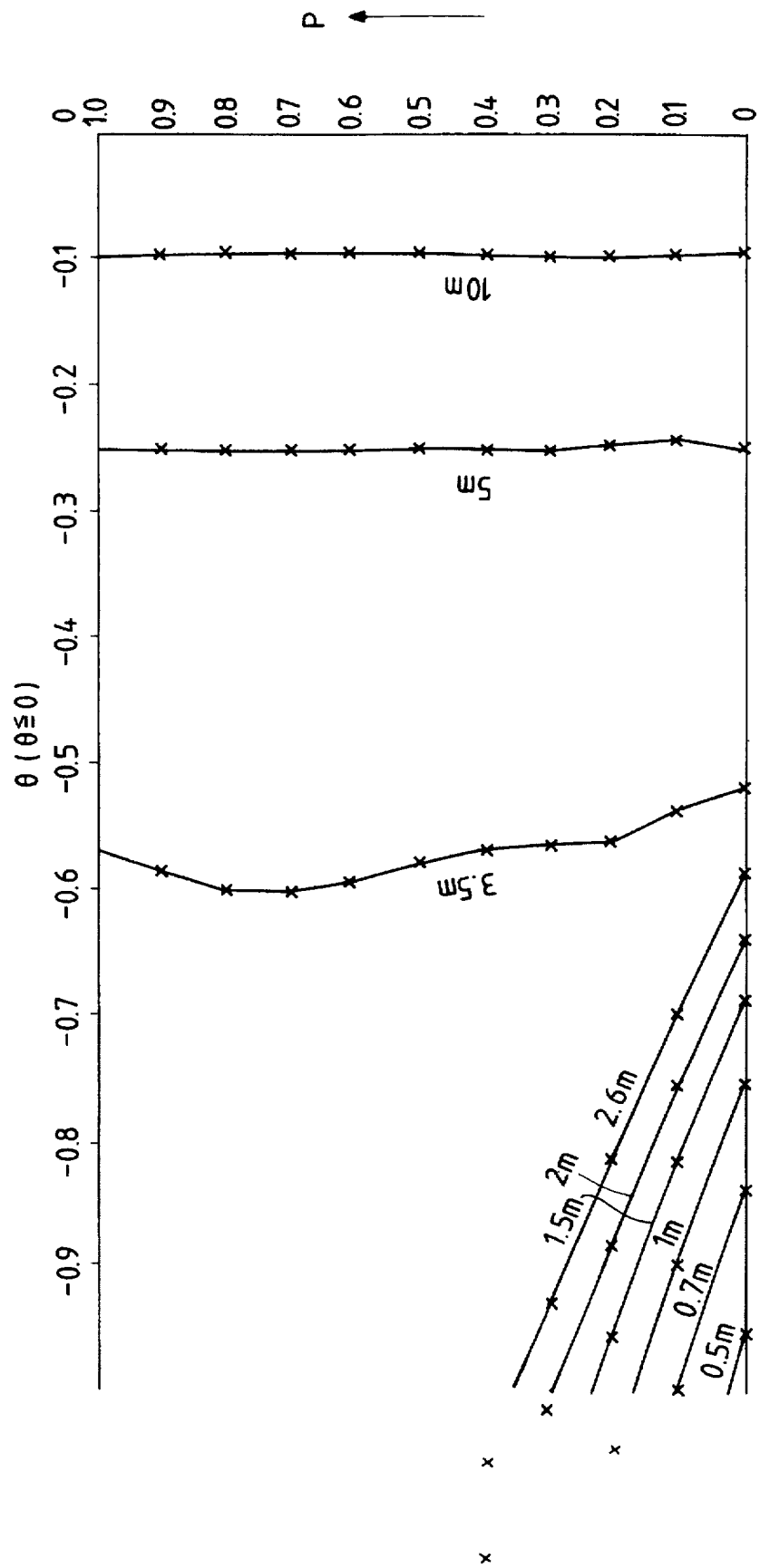
FIG. 17 is a graph showing camera-to-object distances using zoom parameters and focus angles θ in the third embodiment.

A camera-to-object distance is decreased greatly because the amount of movement made by the focus lens group is increased more on an end close to the wide end where the zoom parameter P is zero (P=0) than a focal length on an end close to the telephoto end. The shape B of a cam is the shape of the cam before it is corrected in accordance with this embodiment, in which the amount for focusing with respect to a camera-to-object distance on the telephoto end is reduced even on the wide end. FIG. 17 is a graph based on Table 1.

As described above, the third embodiment can provide a zoom lens barrel with which the closest camera-to-object distance can be obtained when the zoom lens barrel is on the wide end, without using a switching mechanism, even if the magnification of the zoom lens barrel is high.

Fourth embodiment

The fourth embodiment will be described below with reference to FIG. 16 and Table 2.

Figure 16:
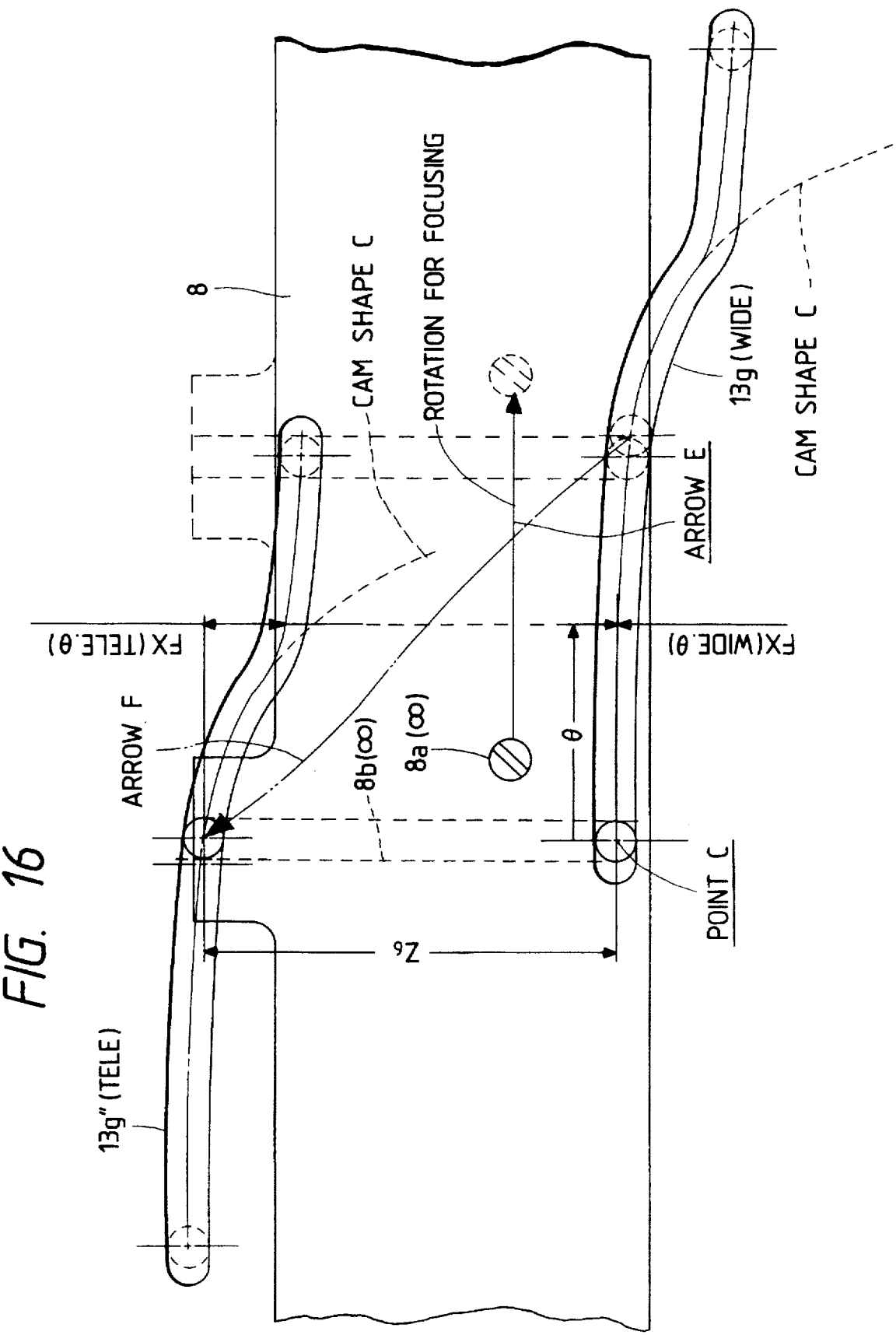
FIG. 16 is a detailed view showing how a focusing cam in a fourth embodiment operates.

FIG. 16 is a detailed view which shows a focus communicating barrel 8 and a focusing cam 13g and 13g" on the wide and telephoto ends. The focusing cam 13g is disposed in a small diameter portion 13b of a cam barrel 13. Arrow E indicates the course in which the focus communicating barrel 8 moves from infinity to the closest point of focus. Arrow F indicates the course in which the focusing cam 13 moves from the wide end to the telephoto end. The length of arrow E is equal to the length of a fixed-pin cam 13c disposed in the large diameter portion 13a of the cam barrel 13.

Figure 21:
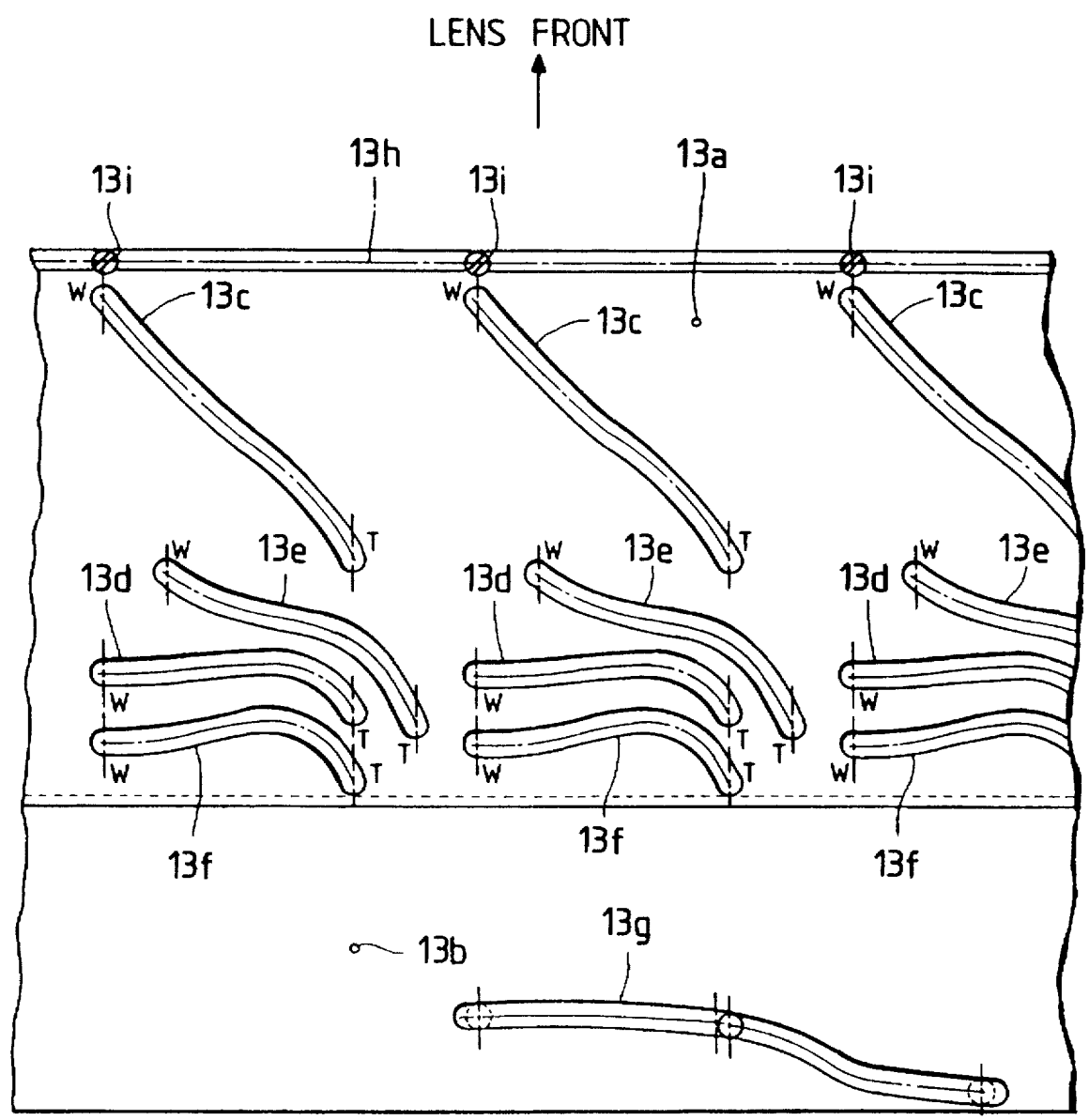
FIG. 21 is a developed view of a cam barrel in the fourth embodiment.
Figure 22:
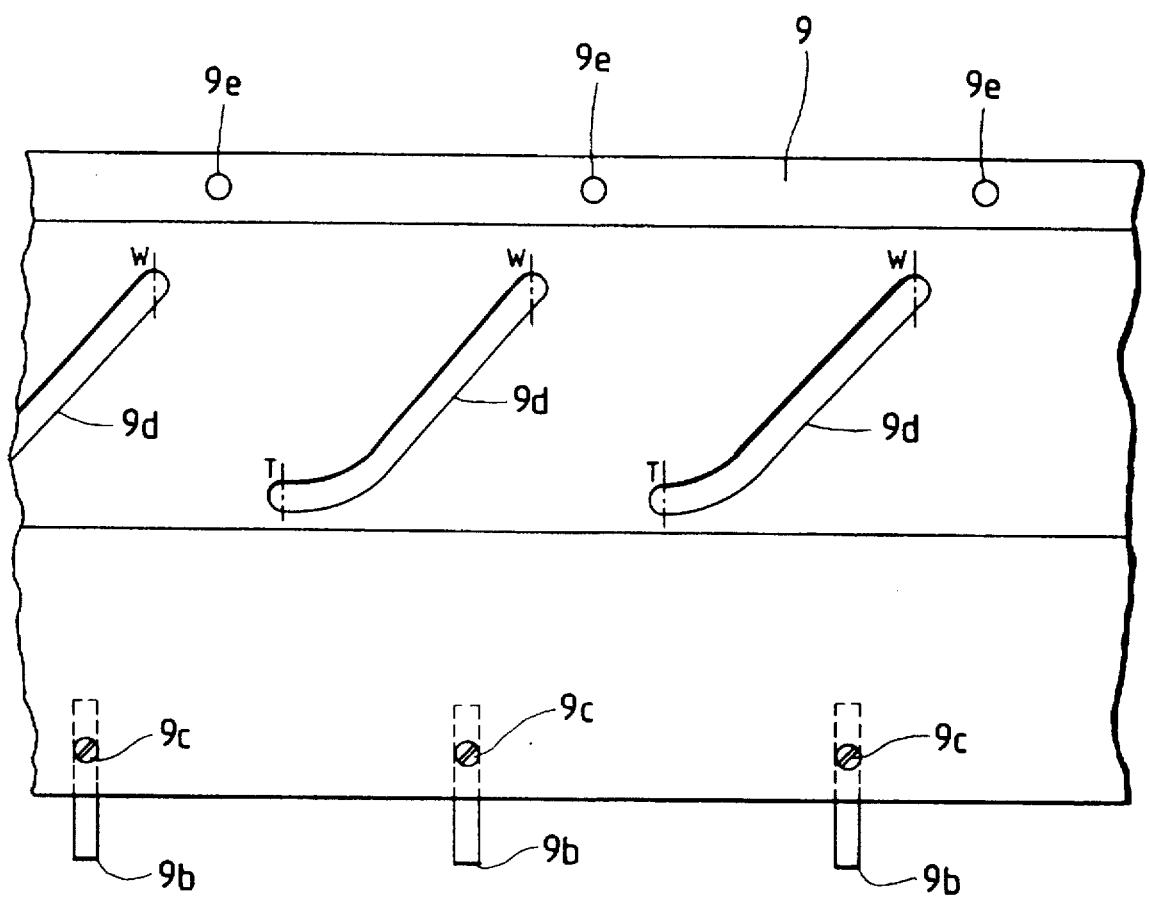
FIG. 22 is a developed view of a first lens barrel group in the fourth embodiment.

The fourth embodiment differs from the first embodiment mentioned above, as shown in FIGS. 21, 22 and 16, which correspond to FIGS. 3, 6 and 10 in the first embodiment, respectively.

In FIG. 1.6 symbol θ indicates a rotation angle when the focus is at infinity; FX(wide, θ) indicates the amount of movement made by the zoom lens barrel on the wide end for focusing; FX(tele, θ) indicates the amount of movement made by the zoom lens barrel on the telephoto end for focusing; point C is used as an origin for describing the shape of the cam; and a length denoted by Z6 indicates the amount of movement made by the sixth lens group set at infinity. As obvious from FIG. 16, the closer the zoom lenses approach the telephoto end, the more the focus movement increases.

[Description of shape of focusing cam]

In FIG. 16 point C corresponds to an infinite focus position in the wide state, and is regarded as the origin. It is assumed that values in the right-hand direction to point C are positive parameters, that the infinite position on the telephoto end is abscissas when P=1, and that positive values are given in the direction in which light passes from point C (in a lower direction of the drawing). When P≦1.38980, cam ordinates DF(P) are expressed by the following equation.

$$DF(P) = 0.16483574 \times P \\ + 0.23411311 \times P^2 \\ + 1.0812920 \times P^3 \\ - 3.0355993 \times P^4 \\ + 6.0473302 \times P^5 \\ - 4.0403452 \times P^6 \\ + 1.3991619 \times P^7$$ (equation 27)

When P>1.38980, the cam ordinates DF(P) are expressed by the following equation.

$$DF(P) = 8 \times \sqrt[6]{P - 1.3678752} + 4.2796284$$ (equation 27')

[Description of zooming operation]

In the above construction, when an operating ring 11 is moved forward for zooming from the wide end to the telephoto end, a first lens barrel 9 moves straight in the same amount as the operating ring 11. At the same time, the cam barrel 13 moves forward rotatively. For this reason, a filter frame 12 moves straight in a forward direction with respect to the first lens barrel 9. The rotative, forward movement of the first lens barrel 9 causes third, fourth and fifth lens barrels 17, 18 and 15 to move straight simultaneously. On the other hand, a vertical groove 8b formed on the focus communicating barrel 8, communicating with the focus key, restricts the rotation of the sixth lens barrel. Because of this restriction, the sixth lens barrel moves straight.

[Description of focusing operation]

A rotation angle θ for focusing has positive values in this embodiment (this is called a wide starting cam). The amount of forward movement DF(P, θ) is determined by the amount of a change from (P) to (p+θ) in cam coordinates DF(P), where P is the amount of zooming, and θ is the rotation angle for focusing. Thus the amount of forward movement DF(P, θ) is expressed by the following equation:

$$DF(P, \theta) = DF(P+\theta) - DF(P)$$ (equation 28)

For example, if P=1, that is, when the amount of forward movement $$DX_{(1)}^{xm}$$

on the telephoto end is equal to DF (1,0), where xm is a given camera-to-object distance, then an object is focused on the telephoto end. When zooming is changed from P=1 to P=0 without altering the rotation angle θ at this phase (that is, while focus is fixed), the amount the cam deviates $$\Delta DX_{(P)}^{xm}$$

is expressed as follows:

$$\Delta DX_{(P)}^{xm} = DF(P, \theta) - DX_{(1)}^{xm}$$ (equation 29)

As shown in FIG. 16, the shape C of the cam is a shape before it is corrected where [66] D(P) always assumes zero (between P=0 and P=1). In this embodiment, in the same manner as the focusing cam 13g in FIG. 16, the shape of the cam is corrected which is defined by equation 27' mentioned above. Therefore, the amount of movement made by the focus lens group for zooming is decreased on the telephoto end and in a region where the rotation angle for focusing increases. The closest camera-to-object distance can be used as a camera-to-object distance for an object in a close range in a zooming region other than that mentioned above.

Figure 18:
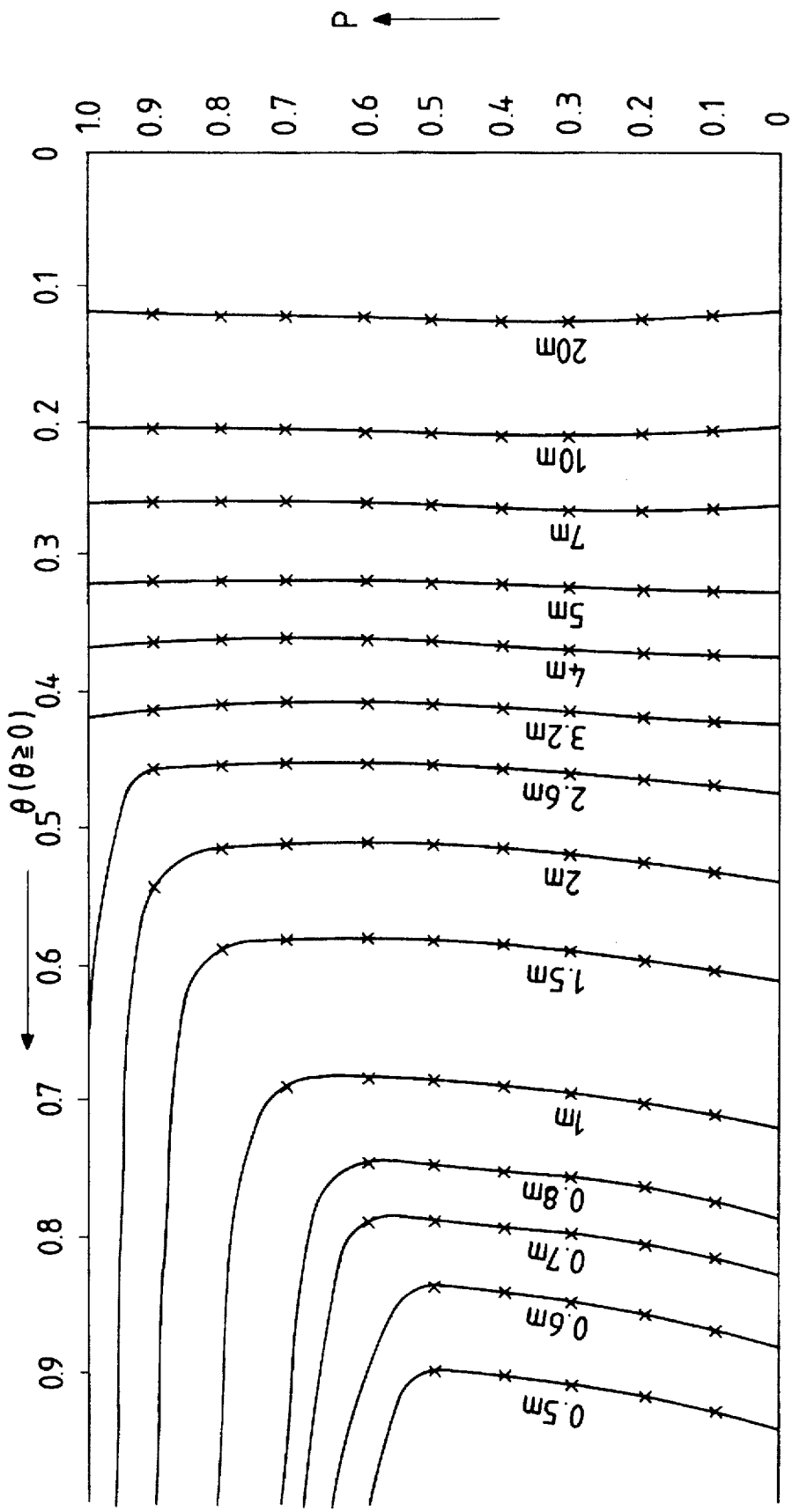
FIG. 18 is a graph showing camera-to-object distances using zoom parameters and focus angles θ in the fourth embodiment.

Table 2 shows zoom parameters and camera-to-object distances at rotation angles θ for focusing. Because the amount of movement made by the focus lens group is reduced in comparison with a focal length on the wide end, a camera-to-object distance increases greatly on the telephoto end, where the zoom parameter P is one (P=1). FIG. 18 is a graph based on Table 2.

TABLE 1

| ZOOM PARAMETERS P | FOCAL LENGTHS | CAMERA-TO-OBJECT DISTANCES (UNIT:m) FOCUS ANGLES | | | | | | | | |
|---|---|---|---|---|---|---|---|---|---|---|
| | | 0 | −0.09749 | −0.25000 | −0.51290 | −0.58648 | −0.63500 | −0.68419 | −0.75644 | −0.83346 | −0.95173 |
| 1.0 | 342.4 | ∞ | 10.00 | 5.00 | 3.60 | 3.47 | 3.41 | 3.35 | 3.30 | 3.25 | 3.20 |
| 0.9 | 273.3 | ∞ | 9.78 | 4.99 | 3.63 | 3.50 | 3.44 | 3.39 | 3.33 | 3.28 | 3.24 |
| 0.8 | 218.1 | ∞ | 9.71 | 5.00 | 3.65 | 3.52 | 3.46 | 3.40 | 3.35 | 3.30 | 3.25 |
| 0.7 | 174.1 | ∞ | 9.69 | 5.00 | 3.66 | 3.52 | 3.46 | 3.40 | 3.34 | 3.29 | 3.25 |
| 0.6 | 139.0 | ∞ | 9.67 | 5.00 | 3.65 | 3.51 | 3.45 | 3.39 | 3.32 | 3.28 | 3.24 |
| 0.5 | 111.0 | ∞ | 9.67 | 5.00 | 3.63 | 3.49 | 3.42 | 3.36 | 3.31 | 3.27 | 3.23 |
| 0.4 | 88.6 | ∞ | 9.71 | 5.01 | 3.61 | 3.47 | 3.40 | 3.36 | 3.32 | 3.28 | 3.09 |
| 0.3 | 70.7 | ∞ | 9.79 | 5.02 | 3.59 | 3.47 | 3.43 | 3.39 | 3.32 | 3.14 | 2.48 |
| 0.2 | 56.5 | ∞ | 9.84 | 4.97 | 3.62 | 3.53 | 3.47 | 3.35 | 3.01 | 2.43 | 1.50 |
| 0.1 | 45.1 | ∞ | 9.71 | 4.88 | 3.73 | 3.47 | 3.16 | 2.72 | 2.00 | 1.36 | 0.81 |
| 0 | 36.0 | ∞ | 9.54 | 5.00 | 3.50 | 2.60 | 2.00 | 1.50 | 1.00 | 0.70 | 0.50 |

TABLE 2

| ZOOM PARAMETERS | FOCAL | CAMERA-TO-OBJECT DISTANCES ||||||||||
| | | FOCUS ANGLES ||||||||||
| P | LENGTHS | 0 | 0.20335 | 0.31858 | 0.38980 | 0.45546 | 0.51566 | 0.58423 | 0.68691 | 0.78672 | 0.89560 |
| --- | --- | --- | --- | --- | --- | --- | --- | --- | --- | --- | --- |
| 1.0 | 342.4 | ∞ | 10.00 | 5.00 | 3.50 | 3.01 | 2.84 | 2.71 | 2.59 | 2.51 | 2.44 |
| 0.9 | 273.3 | ∞ | 10.09 | 5.03 | 3.51 | 2.60 | 2.07 | 1.90 | 1.77 | 1.70 | 1.65 |
| 0.8 | 218.1 | ∞ | 10.07 | 4.99 | 3.48 | 2.57 | 1.98 | 1.50 | 1.26 | 1.18 | 1.14 |
| 0.7 | 174.1 | ∞ | 10.06 | 4.96 | 3.45 | 2.54 | 1.96 | 1.48 | 1.00 | 0.86 | 0.81 |
| 0.6 | 139.0 | ∞ | 10.12 | 4.96 | 3.43 | 2.53 | 1.94 | 1.46 | 0.99 | 0.70 | 0.61 |
| 0.5 | 111.0 | ∞ | 10.29 | 5.01 | 3.46 | 2.53 | 1.94 | 1.46 | 0.99 | 0.70 | 0.50 |
| 0.4 | 88.6 | ∞ | 10.48 | 5.11 | 3.52 | 2.57 | 1.97 | 1.48 | 1.00 | 0.71 | 0.51 |
| 0.3 | 70.7 | ∞ | 10.54 | 5.21 | 3.60 | 2.64 | 2.01 | 1.51 | 1.02 | 0.72 | 0.52 |
| 0.2 | 56.5 | ∞ | 10.35 | 5.25 | 3.67 | 2.70 | 2.07 | 1.55 | 1.05 | 0.74 | 0.53 |
| 0.1 | 45.1 | ∞ | 10.04 | 5.20 | 3.69 | 2.75 | 2.12 | 1.63 | 1.08 | 0.76 | 0.55 |
| 0 | 36.0 | ∞ | 9.93 | 5.14 | 3.68 | 2.77 | 2.17 | 1.66 | 1.13 | 0.80 | 0.57 |

What is claimed is:

1. A zoom lens barrel comprising:

a fixed ring;

a holding ring for holding a lens, said holding ring being mated with said fixed ring at an outside position on said fixed ring and moving in a direction of an optical axis by zooming operation; and a cam ring, said cam ring being mated with said fixed ring at an inside position on said fixed ring, a front portion of said cam ring being protruded from said fixed ring and being mated with said holding ring at an inside position on said holding ring;

wherein said cam ring moves, by zooming operation, in the same direction as the moving direction of said holding ring.

2. A zoom lens barrel according to claim 1, further comprising an operation ring which moves in the direction of the optical axis for the purpose of zooming operation, said retaining ring moving integrally with said operation ring in the direction of the optical axis.

3. A zoom lens barrel according to claim 1, wherein said cam ring is rotated and moved in the direction of the optical axis in response to the movement of said operation ring in the direction of the optical axis.

4. A zoom lens barrel according to claim 3, wherein said cam ring is rotated and moved in the direction of the optical axis in response to the movement of said operation ring in the direction of the optical axis.

5. A zoom lens barrel according to claim 4, wherein said retaining ring has a cam, said cam ring has a cam follower which is engaged with the cam of said retaining ring, said cam follower is rotated to the movement of the cam in the direction of the optical axis.

6. A zoom lens barrel according to claim 5, wherein the lens is a movable lens group which is located at the most front portion.

7. A zoom lens barrel according to claim 5, wherein said cam ring has cam means for moving other lens group different from said lens in the direction of the optical axis.

8. A zoom lens barrel according to claim 7, wherein said cam means moves a plurality of lens groups in the direction of the optical axis.

* * * * *